United States Patent
Lambert et al.

(10) Patent No.: US 11,071,971 B2
(45) Date of Patent: Jul. 27, 2021

(54) MACROPOROUS OXYGEN CARRIER SOLID WITH A REFRACTORY FELDSPAR/FELDSPATHOID, METHOD FOR THE PREPARATION THEREOF, AND USE THEREOF IN A CHEMICAL-LOOPING OXIDATION-REDUCTION METHOD

(71) Applicants: IFP Energies nouvelles, Rueil-Malmaison (FR); TOTAL RAFFINAGE CHIMIE, Courbevoie (FR)

(72) Inventors: Arnold Lambert, Chavanay (FR); Catherine Laroche, Vernaison (FR); Delphine Marti, Lyons (FR); Elodie Comte, Saint-Fons (FR)

(73) Assignees: IFP ENERGIES NOUVELLES, Rueil-Malmaison (FR); TOTAL RAFFINAGE CHIMIE, Courbevoie (FR)

( * ) Notice: Subject to any disclaimer, the term of this patent is extended or adjusted under 35 U.S.C. 154(b) by 184 days.

(21) Appl. No.: 16/471,403

(22) PCT Filed: Dec. 21, 2017

(86) PCT No.: PCT/EP2017/084209
§ 371 (c)(1),
(2) Date: Jun. 19, 2019

(87) PCT Pub. No.: WO2018/115345
PCT Pub. Date: Jun. 28, 2018

(65) Prior Publication Data
US 2019/0381488 A1    Dec. 19, 2019

(30) Foreign Application Priority Data

Dec. 23, 2016 (FR) ............................ 16/63.302

(51) Int. Cl.
*B01J 29/89* (2006.01)
*B01J 23/00* (2006.01)
(Continued)

(52) U.S. Cl.
CPC ............ *B01J 29/89* (2013.01); *B01J 23/005* (2013.01); *B01J 23/72* (2013.01); *B01J 35/0093* (2013.01);
(Continued)

(58) Field of Classification Search
CPC . B01J 23/005; B01J 23/72; B01J 29/89; B01J 37/0018; B01J 37/0063;
(Continued)

(56) References Cited

U.S. PATENT DOCUMENTS 4,814,303 A * 3/1989 Chowdhry .......... H01L 21/4807
501/119
5,447,024 A   9/1995 Ishida et al.

FOREIGN PATENT DOCUMENTS

| EP | 3040122 A1 | 7/2016 |
| WO | 2006/123925 A1 | 11/2006 |
| WO | 2012/155059 A1 | 11/2012 |

OTHER PUBLICATIONS

International Search Report for PCT/EP2017/084209, dated Apr. 10, 2018, and English translation submitted herewith (13 pages).
(Continued)

*Primary Examiner* — Brian A McCaig
(74) *Attorney, Agent, or Firm* — Fitch, Even, Tabin & Flannery, L.L.P.

(57) ABSTRACT

The invention relates to an oxygen carrier solid, its preparation and its use in a method of combustion of a hydrocarbon feedstock by active mass chemical-looping oxidation-reduction, i.e. chemical-looping combustion (CLC). The solid, which is in the form of particles, comprises an
(Continued)

oxidation-reduction active mass composed of metal oxide(s) dispersed in a ceramic matrix comprising at least at least one feldspar or feldspathoid with a melting point higher than 1500° C., such as celsian, and has, initially, a specific macroporous texture. The oxygen carrier solid is prepared from a precursor of the ceramic matrix, obtained from a macroporous zeolitic material with zeolite crystals of a specific size, and a precursor of the oxidation-reduction active mass.

24 Claims, 11 Drawing Sheets

(51) Int. Cl.
B01J 23/72 (2006.01)
B01J 35/00 (2006.01)
B01J 35/02 (2006.01)
B01J 35/10 (2006.01)
B01J 37/00 (2006.01)
B01J 37/02 (2006.01)
B01J 37/08 (2006.01)
F23C 10/01 (2006.01)
F23C 13/08 (2006.01)

(52) U.S. Cl.
CPC ........... *B01J 35/023* (2013.01); *B01J 35/108* (2013.01); *B01J 35/1038* (2013.01); *B01J 35/1042* (2013.01); *B01J 37/0063* (2013.01); *B01J 37/0205* (2013.01); *B01J 37/08* (2013.01); *F23C 10/01* (2013.01); *F23C 13/08* (2013.01); *F23C 2206/10* (2013.01); *F23C 2900/99008* (2013.01)

(58) Field of Classification Search
CPC .. B01J 37/009; B01J 37/0203; B01J 37/0205; B01J 37/08; B01J 35/002; B01J 35/0026; B01J 35/0093; B01J 35/023; B01J 35/1009; B01J 35/1038; B01J 35/1042; B01J 35/1061; B01J 35/1066; B01J 35/1071; B01J 35/1076; B01J 35/1095; B01J 35/108; F23C 10/01; F23C 13/08; F23C 2206/10; C01B 32/50; Y02E 20/34
See application file for complete search history.

(56) References Cited

OTHER PUBLICATIONS

Written Opinion of International Searching Authority for PCT/EP2017/084209.
Jeom-In Baek et al: "Effect of MgO addition on the physical properties and reactivity of the spray-dried oxygen carriers prepared with a high content of NiO and Al2O3", Fuel, vol. 144, Nov. 21, 2014 (Nov. 21, 2014), pp. 317-326, XP055460121, GB ISSN: 0016-2361.
Yu Fu et al: "Effective Macroporous Core-Shell Structure of Alumina-Supported Spinel Ferrite for Carbon Dioxide Splitting Based on Chemical Looping", Energy Technology, vol . 4, No. 11, Jul. 21, 2016 (Jul. 21, 2016), pp. 1349-1357, XP055404110.
Claudia Weidenthaler et al: "Thermal Stability and Thermal Transformations of Co2+—or Ni2+—Exchanged Zeolites A, X, and Y" Chemistry of Materials, vol . 12, No. 12, Dec. 1, 2000 (Dec. 1, 2000), pp. 3811-3820, XP055405449, US ISSN: 0897-4756.
Bahar Hoghooghi et al: "Microstructural Development, Densification, and Hot Pressing of Celsian Ceramics from Ion-Exchanged Zeolite Precursors", Journal of the American Ceramic Society., vol. 81, No. 4, Apr. 1, 1998 (Apr. 1, 1998), pp. 845-852, XP055405411, US ISSN: 0002-7820.
Esposito Set al: "A comparative study of the thermal transformations of Ba-exchanged zeolites A, X and LSX", Journal of the European Ceramic Society, Elsevier Science Publishers, Barking, Essex, GB, vol. 24, No. 9, Aug. 1, 2004 (Aug. 1, 2004) , pp. 2689-2697, XP027107159, ISSN: 0955-2219.
Jerndal et al: "Thermal Analysis of Chemical-Looping Combustion", Chemical Engineering Research and Design, Elsevier, Amsterdam, NL, vol . 84, No. 9, Sep. 1, 2006 (Sep. 1, 2006), pp. 795-806, XP022536199, ISSN: 0263-8762.
Ilyushechkin Alexander Y et al: "Interactions between oxygen carriers used for chemical looping combustion and ash from brown coals", Fuel Processing Technology, Elsevier BV, NL, vol. 147, Dec. 3, 2015 (Dec. 3, 2015), pp. 71-82, XP029555925, ISSN: 0378-3820.
Adanez, J., Abad, A., Garcia-Labiano, F., Gayan, P. & de Diego, L.F., "Progress in Chemical Looping Combustion and Reforming Technologies", Progress in Energy and Combustion Science, 38(2), (2012) 215-282.
Wei et al. ("Continuous Operation of a 10 kWth Chemical Looping Integrated Fluidized Bed Reactor for Gasifying Biomass Using an Iron-Based Oxygen Carrier". Energy Fuels 29, 233-41, (2015).
C.R. Forero, P. Gayán, F. García-Labiano, L.F. de Diego, A. Abad, J. Adánez, High Temperature Behaviour of a CuO/γAl2O3 Oxygen Carrier for Chemical-Looping Combustion, Int. J. Greenhouse Gas Control 5 (2011) 659-667.
Adanez-Rubio et al. "Investigation of Combined Supports for Cu-Based Oxygen Carriers for Chemical-Looping with Oxygen Uncoupling (CLOU)", Energy Fuels (2013), vol. 27, 3918-3927.
Jerndal, E., Mattisson, T., Thijs, I., Snijkers, F. & Lyngfelt, A., "Investigation of NiO/NiAl2O4 oxygen carriers for chemical-looping combustion produced by spray-drying", International Journal of Greenhouse Gas Control, 4, (2010).
Linderholm et al., Chemical-looping combustion in a 100-kW unit using a mixture of ilmenite and manganese ore as oxygen carrier, Fuel, 166 (2016), 533-542.
J.C. Abanades, B. Arias, A. Lyngfelt, T. Mattisson, D.E. Wiley, H. Li, M.T. Ho, E. Mangano, S. Brandani, "Emerging CO2 Capture Systems", Int. J. Greenhouse Gas Control 40 (2015), 126-166.
P. Knutsson and C. Linderholm, "Characterization of Ilmenite used as Oxygen Carrier in a 100 kW Chemical-Looping Combustor for Solid Fuels", 3rd International Conference on Chemical Looping, Sep. 9-11, 2014, Gothenburg, Sweden.
L.S. Fan et al., "Chemical-Looping Technology Platform". AIChE J. vol. 61, No. 1, pp. 2-22, (2015).
Linderholm, C., Mattisson, T. & Lyngfelt, A., "Long-term integrity testing of spray-dried particles in a 10-kW chemical-looping combustor using natural gas as fuel", Fuel, 88 (11), (2009) 2083-2096.
L. S. Fan et al., "Ionic diffusion in the oxidation of iron—effect of support and its implications to chemical looping applications". Energy Environ. Sci., 4, 876-880, (2011).

* cited by examiner (a) (b)

MACROPOROUS OXYGEN CARRIER SOLID WITH A REFRACTORY FELDSPAR/FELDSPATHOID, METHOD FOR THE PREPARATION THEREOF, AND USE THEREOF IN A CHEMICAL-LOOPING OXIDATION-REDUCTION METHOD

CROSS-REFERENCE TO RELATED APPLICATIONS

This application is a U.S. national phase application filed under 35 U.S.C. § 371 of International Application No. PCT/EP2017/084209, filed Dec. 21, 2017, designating the United States, which claims priority from French Patent Application No.: 16/63.302, filed Dec. 23, 2016, the entire content of each of which are hereby incorporated herein by reference.

FIELD OF THE INVENTION

The present invention relates to an oxygen carrier solid, the preparation thereof and the use thereof in a chemical looping redox process on an active mass. In particular, the new type of oxygen carrier solid according to the invention possibly being used in a chemical looping combustion (CLC) process.

GENERAL CONTEXT

Chemical looping redox processes on an active mass are known in the field of energy production, gas turbines, boilers and furnaces, especially for the oil, glass and cement industry.

In particular, the production of electricity, heat, hydrogen or steam can be achieved by processes of this type, typically the CLC process, using redox reactions of an active mass, referred to as a redox mass, conventionally a metal oxide, to produce a hot gas from a fuel, for example natural gas, carbon monoxide CO, hydrogen $H_2$, coals or petroleum residues, a mixture of hydrocarbons, and to isolate the carbon dioxide $CO_2$ produced. It is then conceivable to store the captured $CO_2$ in geological formations, or to use it as a reagent in other processes, or else to inject it into oil wells in order to increase the amount of hydrocarbons extracted from the deposits (enhanced oil recovery (EOR) and enhanced gas recovery (EGR)).

In such a chemical looping redox process on an active mass, a first reaction of oxidation of the active mass with air or another oxidizing gas, acting as oxidizer, makes it possible, because of the exothermic nature of the oxidation, to obtain a hot gas, the energy of which can then be exploited. When the oxidizing gas is water vapor, the oxidation of the active mass also makes it possible to produce an $H_2$-rich gaseous effluent.

A second reaction of reduction of the oxidized active mass with the aid of a reducing gas, liquid or solid (hydrocarbon feedstock) then makes it possible to obtain a reusable active mass and also a gas mixture comprising essentially $CO_2$ and water, or even synthesis gas containing CO and $H_2$, depending on the conditions brought about during the reduction step.

In a CLC process, the energy can be produced in the form of steam or electricity for example. The heat of combustion of the hydrocarbon feedstock is similar to that encountered in conventional combustion. This corresponds to the sum of the heats of reduction and of oxidation in the chemical loop. The heat is generally extracted by exchangers located inside, in the wall or appended to the fuel and/or air reactors, on the flue gas lines, or on the active mass transfer lines.

A major advantage of these chemical looping redox processes on an active mass is then to make it possible to easily isolate the $CO_2$ (or the synthesis gas) contained in the oxygen-free and nitrogen-free gas mixture constituting the effluent from the reduction reactor. Another advantage consists of the production of a stream of nitrogen $N_2$ (and argon) containing almost no oxygen, and corresponding to the effluent from the oxidation reactor, when air is used as oxidizing gas.

In a context of increasing global energy demand, the CLC process therefore provides an attractive solution for capturing $CO_2$ with a view to the sequestration thereof or reuse thereof for other processes, in order to limit the emission of environmentally harmful greenhouse gases.

U.S. Pat. No. 5,447,024 describes for example a CLC process comprising a first reactor for reducing an active mass using a reducing gas and a second, oxidation reactor for restoring the active mass to its oxidized state by an oxidation reaction with moist air. The circulating fluidized-bed technology is used to allow the continuous passage of the active mass from the reduction reactor to the oxidation reactor and vice versa.

Patent application WO 2006/123925 describes another implementation of the CLC process using one or more fixed-bed reactors containing the active mass, the redox cycles being carried out by switching the gases in order to successively carry out the reactions of oxidation and reduction of the active mass.

The active mass, passing alternately from its oxidized form to its reduced form and vice versa, follows a redox cycle.

It should be noted that, in general, the terms oxidation and reduction are used in relation to the respectively oxidized or reduced state of the active mass. The oxidation reactor is the one in which the active mass is oxidized and the reduction reactor is the reactor in which the active mass is reduced.

Thus, in the reduction reactor, the active mass, generally a metal oxide ($M_xO_y$), is firstly reduced to the $M_xO_{y-2n-m/2}$ state, by means of a $C_nH_m$ hydrocarbon, which is correlatively oxidized to $CO_2$ and $H_2O$, according to reaction (1), or optionally to a $CO+H_2$ mixture depending on the nature of the active mass and the proportions used.

$$C_nH_m + M_xO_y \rightarrow nCO_2 + m/2 H_2O + M_xO_{y-2n-m/2} \qquad (1)$$

In the oxidation reactor, the active mass is restored to its oxidized state ($M_xO_y$) in contact with air according to reaction (2), before returning to the first reactor.

$$MxO_{y-2n-m/2} + (n+m/4)O_2 \rightarrow M_xO_y \qquad (2)$$

In the case where the oxidation of the active mass is carried out by steam, a stream of hydrogen is obtained at the outlet of the oxidation reactor (reaction (3)).

$$M_xO_{y-2n-m/2} + (2n+m/2)H_2O \rightarrow M_xO_y + (2n+m/2)H_2 \qquad (3)$$

In the equations above, M represents a metal.

The active mass acts an an oxygen carrier in the chemical looping redox process. Thus the solid comprising the active mass, typically comprising the metal oxide(s) capable of exchanging oxygen under the redox conditions of the chemical looping redox process, is commonly denoted as the oxygen carrier solid.

The oxygen carrier solid may further comprise a binder or a support in combination with the active mass, in particular to ensure good reversibility of the oxidation and reduction reactions, and to improve the mechanical strength of the particles. Specifically, the active masses, chosen for example from copper, nickel, iron, manganese and/or cobalt redox couples, are generally not used in pure form since the successive oxidation/reduction cycles at high temperature lead to a significant and rapid reduction in the oxygen transfer capacity, due to the sintering of the particles.

Thus, in U.S. Pat. No. 5,447,024, the oxygen carrier solid comprises a NiO/Ni redox couple as active mass, combined with a YSZ binder which is yttrium-stabilized zirconia, also referred to as yttria zirconia.

Many types of binders and supports, in addition to yttria zirconia YSZ, have been studied in the literature in order to increase the mechanical strength of particles at a lower cost than YSZ. Among these, mention may be made of alumina, metal aluminate spinels, titanium dioxide, silica, zirconia, ceria, kaolin, bentonite, etc.

The effectiveness of the chemical looping redox process depends mainly on the physicochemical properties of the oxygen carrier solid. In addition to the reactivity of the active mass involved and the oxygen transfer capacity of the oxygen carrier solid (active mass+binder/support), which have an influence on the sizing of the reactors and, in the case of circulating fluidized-bed technology, on the particle circulation rates, the lifetime of the particles in the process has a preponderant impact on the operating cost of the process, particularly in the case of the circulating fluidized-bed process.

Specifically, in the case of the circulating fluidized-bed process, the attrition rate of the particles makes it necessary to compensate for the loss of oxygen carrier solid in the form of fines, typically particles of the oxygen carrier solid with a diameter of less than 40 µm, with fresh oxygen carrier solid. The rate of replacement of the oxygen carrier solid therefore depends greatly on the mechanical strength of the particles and also on their chemical stability under the process conditions, which includes many successive oxidation/reduction cycles.

In general, the performance of oxygen carrier solids reported in the literature is satisfactory in terms of oxygen transfer capacity and reactivity with the various hydrocarbons tested (Adanez, J., Abad, A., Garcia-Labiano, F., Gayan, P. & de Diego, L. F., "Progress in Chemical Looping Combustion and Reforming Technologies", Progress in Energy and Combustion Science, 38(2), (2012) 215-282). However, in most publications, too short a test period and/or the lack of thorough characterization of the particles after the test do not make it possible to conclude as to the lifetime of the particles in the CLC process, although some authors announce significant lifetimes.

Some recent studies highlight the problem of the lifetime of particles related to the many redox cycles undergone by the particles in the CLC process.

For example, the problem of the lifetime of ilmenite particles ($FeTiO_3$ ore) has recently been highlighted by P. Knutsson and C. Linderholm ("Characterization of Ilmenite used as Oxygen Carrier in a 100 kW Chemical-Looping Combustor for Solid Fuels", 3rd International Conference on Chemical Looping, Sep. 9-11, 2014, Gothenburg, Sweden). After a long-term test in a 100 kWth circulating fluidized-bed pilot plant, SEM characterization of the aged particles shows that a high porosity has developed within the particles, which results in the disintegration thereof in the form of fines which are eliminated in gas/solid separation cyclones. The porosity of the ilmenite ore particles increases greatly with the redox cycles and results in the pulverisation thereof, potentially calling into question the suitability of this ore for the process, even though the initial studies on the use of ilmenite concluded that it was very suitable for the CLC process. The increase in porosity observed by the detailed characterization of the particles after the test is concomitant with the migration of ferrous and/or ferric ions by diffusion within the particles. According to the authors, segregation of the iron within the particles precedes its migration to the surface, creating the porosity that results in the disintegration of the particles in the form of fines. The appearance of porosity is the main mechanism for the formation of fine particles during the process, considerably limiting the lifetime of the particles, and therefore the potential value of the ore for the CLC application. Specifically, the estimated lifetime of the ilmenite particles is of the order of only 200 hours ("Emerging $CO_2$ Capture Systems", J. C. Abanades, B. Arias, A. Lyngfelt, T. Mattisson, D. E. Wiley, H. Li, M. T. Ho, E. Mangano, S. Brandani, Int. J. Greenhouse Gas Control 40 (2015), 126). The attrition phenomenon of the oxygen carrier solid is thus mainly due to a morphological evolution linked to the consecutive redox cycles undergone by the particles rather than to impacts on the walls and between particles, customarily considered as the main source of attrition in fluidized-bed processes.

Wei et al. ("Continuous Operation of a 10 kWth Chemical Looping Integrated Fluidized Bed Reactor for Gasifying Biomass Using an Iron-Based Oxygen Carrier". Energy Fuels 29, 233, 2015) also mention the conversion of synthetic particles of $Fe_2O_3/Al_2O_3$ (70/30) into small grains (i.e. pulverization of the particles into fines) after only 60 h of combustion in a circulating fluidized bed.

L. S. Fan et al. ("Chemical-Looping Technology Platform". AIChE J. 61, 2, 2015) state that the lack of demonstration of the CLC process on an industrial scale is related to the unsuitability of the oxygen carrier solids in terms of reactivity, recyclability, oxygen transfer capacity, mechanical strength and attrition resistance. According to these authors, the initial studies on the oxygen carrier solids did not realize the importance of the cationic and anionic migration mechanisms within the particles, which lead to phase segregations, the appearance of cavities or micropores, agglomeration, sintering, etc.

Patent application WO 2012/155059 discloses the use of oxygen carrier solids consisting of an active mass (20 to 70% by weight), of a primary support material of ceramic or clay type (5 to 70% by weight), and of a secondary support material (1 to 35% by weight), also of ceramic or clay type. An improved mechanical stability related to the control of the volume expansion is put forward for these oxygen carrier solids. It is explained that a diffusion movement of the iron ions toward the outside of the particles causes the volume expansion of the particles, which leads to embrittlement of the particles. In the solid according to WO 2012/155059, the primary support material would make it possible to disperse the metallic active mass and would prevent its agglomeration, preserving the redox activity, whereas the secondary support material would help to reduce the rate of volume expansion by forming a stabilizing solid phase that would prevent the migration of the iron toward the surface.

Numerous studies relating to a metal oxide (active mass generally based on an oxide of Cu, Ni, Co, Fe and/or Mn) on a support conclude that most of the formulations tested are suitable for the CLC process.

However, Forero et al. (C. R. Forero, P. Gayán, F. García-Labiano, L. F. de Diego, A. Abad, J. Adánez, Int. J. Greenhouse Gas Control 5 (2011) 659-667) report a significant loss of copper oxide, probably attributable to the migration of the active phase toward the outside of the particles during the redox cycles. The copper at the surface is then removed in the fines by attrition. In addition, the porosity of the $CuO/Al_2O_3$ particles increases with the number of cycles, and the aluminous matrix gradually cracks, resulting in the formation of fine particles. Adanez-Rubio et al. (Energy Fuels 2013 (27) 3918) thus report that the tapped (packed) density of batches of particles based on CuO impregnated on various supports ($TiO_2$, $SiO_2$, $MgAl_2O_4$) decreases significantly, which can be attributed to a significant increase in the porosity of the particles and means that the lifetime of these particles is limited.

The migration of the metal with the number of cycles is also encountered with $Fe_2O_3/Al_2O_3$ particles, as reported by L. S. Fan et al. ("Ionic diffusion in the oxidation of iron—effect of support and its implications to chemical looping applications". Energy Environ. Sci., 4, 876, 2011).

Lyngfelt et al. performed a 1000 h test with nickel-based particles (40% NiO/60% $NiAl_2O_4$) in a circulating fluidized-bed plant with a power of 10 kWth (Linderholm, C., Mattisson, T. & Lyngfelt, A., "Long-term integrity testing of spray-dried particles in a 10-kW chemical-looping combustor using natural gas as fuel", Fuel, 88(11), (2009) 2083-2096). The authors conclude that the lifetime of the particles is of the order of 33 000 h, but a fairly high proportion of agglomerates is observed at the end of the test and part of the solid adhered to the walls of the reactor. The presence of nickel metal on the surface of the particles, due to the migration of nickel to the outside, is probably responsible for the formation of the agglomerates observed (Jerndal, E., Mattisson, T., Thijs, I., Snijkers, F. & Lyngfelt, A., "Investigation of $NiO/NiAl_2O_4$ oxygen carriers for chemical-looping combustion produced by spray-drying", International Journal of Greenhouse Gas Control, 4, (2010) 23). Such agglomerates represent a significant risk of accidental shutdown of the CLC process. In addition, the characterization of the aged particles is insufficient to really conclude in the advantage of this solid for CLC. Batch fluidized bed tests on particles of a similar carrier, carried out by the applicants, show a large migration of nickel toward the periphery of the particles and the formation of fine particles (0.1 to 5 μm in size) consisting essentially of nickel on the surface of large particles. The particles tested are initially purely mesoporous.

The search for a high-performance oxygen carrier solid, in terms of oxygen transfer capacity, reactivity with the various hydrocarbon feedstocks capable of being treated, and mechanical strength, therefore remains a primary objective for the development of chemical looping redox processes, such as CLC.

OBJECTIVES AND SUMMARY OF THE INVENTION

The present invention aims to overcome the problems of the prior art disclosed above, and generally aims to provide an oxygen carrier solid for a chemical looping redox process which has a long lifetime during the use thereof in the process, in particular in order to reduce the investment costs and/or operating costs for such processes.

Thus, to achieve at least one of the aforementioned objectives, among others, the present invention proposes, according to a first aspect, an oxygen carrier solid in the form of particles for a process for chemical looping redox combustion of a hydrocarbon feedstock, comprising:
- a redox active mass constituting between 5% and 75% by weight of the oxygen carrier solid, the redox active mass comprising a metal oxide or a mixture of metal oxides and being capable of transporting oxygen in the chemical looping redox combustion process;
- a ceramic matrix within which the redox active mass is dispersed, the ceramic matrix constituting between 25% and 95% by weight of the oxygen carrier solid, and the ceramic matrix comprising between 60% and 100% by weight of at least one feldspar or feldspathoid having a melting point above 1500° C. and between 0% and 40% of at least one oxide;
- a porosity such that:
  the total pore volume of the oxygen carrier solid, measured by mercury porosimetry, is between 0.05 and 0.9 ml/g,
  the pore volume of the macropores constitutes at least 10% of the total pore volume of the oxygen carrier solid;
  the size distribution of the macropores within the oxygen carrier solid, measured by mercury porosimetry, is between 50 nm and 7 μm.

Preferably, the total pore volume of the oxygen carrier solid is between 0.1 and 0.5 ml/g.

The total pore volume of the macropores constitutes at least 50% of the pore volume of the oxygen carrier solid.

Preferably, the size distribution of the macropores within the oxygen carrier solid is between 50 nm and 4 μm.

Preferably, the redox active mass comprises at least one metal oxide included in the list consisting of the oxides of Fe, Cu, Ni, Mn and/or Co, a perovskite having redox properties, preferably a perovskite of formula $CaMnO_3$, a metal aluminate spinel having redox properties, preferably a metal aluminate spinel of formula $CuAl_2O_4$ or a cuprospinel of formula $CuFe_2O_4$.

According to one embodiment of the invention, the redox active mass comprises at least one copper oxide.

Advantageously, said at least one feldspar or feldspathoid has a melting point above 1700° C.

Advantageously, said at least one feldspar or feldspathoid of the ceramic matrix is a feldspar selected from the list consisting of celsian, slawsonite, anorthite, or a feldspathoid being kalsilite, and is preferably celsian.

Said at least one oxide of the ceramic matrix may be selected from the list consisting of alumina, metal aluminates, silica, silicates, aluminosilicates, titanium dioxide, perovskites and zirconia.

Preferably, the particles have a particle size such that more than 90% of the particles have a size of between 50 μm and 600 μm.

According to a second aspect, the invention relates to a process for preparing the oxygen carrier solid according to the invention, comprising the following steps:
(A) preparing a precursor of a ceramic matrix comprising:
  a1) the preparation of a macroporous zeolite material, the macroporous zeolite material comprising zeolite crystals with a number-average diameter of less than or equal to 3 μm, and preferably a number-average diameter of between 0.4 μm and 2 μm; and
  a2) a cation exchange of said macroporous zeolite material with a solution of precursor ions, the precursor ions being selected to form a feldspar or feldspathoid with a melting point>1500° C. of the ceramic matrix at the end of step (D), the cation exchange being followed by a washing of said macroporous zeolite material, to obtain the precursor of the ceramic matrix;
(B) impregnating said precursor of the ceramic matrix obtained in step (A) with a precursor compound of a redox active mass;

(C) forming particles of the precursor of the ceramic matrix during step (a1) or at the end of step (B);
(D) drying the precursor of the impregnated ceramic matrix in particle form obtained at the end of all of the steps (A), (B) and (C); and
(E) calcining the precursor of the impregnated and dried ceramic matrix obtained in step (D) to obtain the oxygen carrier solid in the form of particles.

According to one embodiment, step a1) comprises:
a'1) agglomerating the zeolite crystals with a clay binder to form a zeolite agglomerate;
a'2) shaping of the zeolite agglomerate obtained in step a'1) to produce particles, followed by a drying of said particles, and optionally followed by a screening and/or cycloning step;
a'3) calcining the particles of the zeolite agglomerate obtained in step a'2) at a temperature between 500° C. and 600° C. to produce the macroporous zeolite material in the form of particles;
a'4) optionally zeolitizing the clay binder by bringing the product resulting from step a'3) into contact with an alkali metal basic aqueous solution, followed by washing.

Advantageously, the zeolite crystals comprise at least one zeolite with an Si/Al molar ratio of between 1.00 and 1.50, preferably the zeolite crystals comprising at least one zeolite selected from A, X, LSX and low-silica EMT zeolites, the low-silica EMT zeolites having an Si/Al ratio of between 1.0 and 1.4.

According to one embodiment, the cation exchange in step a2) is carried out with a solution comprising alkali metal ions, preferably K+ ions, or alkaline-earth metal ions, and preferably with a solution comprising alkaline-earth metal ions.

Preferably, the cation exchange in step a2) is carried out with a solution comprising ions selected from $Ba^{2+}$, $Sr^{2+}$ and $Ca^{2+}$ ions, and preferably with a solution comprising $Ba^{2+}$ ions.

According to one embodiment, step (A) additionally comprises a step a3) of heat treatment of the macroporous zeolite material obtained in step a2), the heat treatment comprising a step of drying at a temperature of between 100° C. and 400° C.

According to one embodiment, in step (C), the precursor of the ceramic matrix is formed into particles having a particle size such that more than 90% of the particles have a size of between 50 μm and 600 μm.

According to one embodiment, the impregnation in step (B) is carried out with an aqueous or organic solution containing at least one soluble precursor compound of copper, nickel, cobalt, iron or manganese, preferably with an aqueous solution containing at least one precursor compound of the redox active mass selected from the list consisting of nitrates of the following formulae: $Cu(NO_3)_2 \cdot xH_2O$, $Ni(NO_3)_2 \cdot xH_2O$, $Co(NO_3)_2 \cdot xH_2O$, $Fe(NO_3)_3 \cdot xH_2O$, $Mn(NO_3)_2 \cdot xH_2O$.

The impregnation in step (B) may be carried out in one or more successive steps, and preferably comprises intermediate steps of drying at a temperature between 30° C. and 200° C. and/or of calcining at a temperature between 200° C. and 600° C. when the impregnation is performed in several successive steps.

According to one embodiment of the invention, the drying in step (D) is carried out in air or in a controlled atmosphere, at a temperature between 30° C. and 200° C., and preferentially in air at a temperature between 100° C. and 150° C.

According to one embodiment of the invention, the calcining in step (E) is carried out in air between 450° C. and 1400° C., preferably between 600° C. and 1000° C., more preferentially between 700° C. and 900° C., and is carried out for a period of 1 to 24 hours, and preferably for a period of 5 to 15 hours.

According to one embodiment of the invention, in step a1), the zeolite crystals are mixed with at least one oxide selected from the list consisting of alumina, metal aluminates, silica, silicates, aluminosilicates, titanium dioxide, perovskites, zirconia, and/or a pore-forming agent intended for increasing the macroporosity of the macroporous zeolite material.

According to a third aspect, the invention relates to a process for chemical looping redox combustion of a hydrocarbon feedstock using an oxygen carrier solid according to the invention or prepared according to the preparation process according to the invention.

Advantageously, the invention relates to a CLC process, preferably in which the oxygen carrier solid circulates between at least one reduction zone and one oxidation zone both operating in a fluidized bed, the temperature in the reduction zone and in the oxidation zone being between 400° C. and 1400° C., preferably between 600° C. and 1100° C., and more preferentially between 800° C. and 1100° C.

Other subject-matters and advantages of the invention will become apparent on reading the description which follows of specific exemplary embodiments of the invention, given by way of nonlimiting examples, the description being made with reference to the appended figures described below.

BRIEF DESCRIPTION OF THE FIGURES

FIG. 1A is a graph giving information on the porosity of the oxygen carrier solid. FIG. 1B is a graph representing the conversion of methane as a function of the redox cycles in a CLC process using the oxygen carrier solid. FIG. 1C is a graph representing the particle size distribution of the oxygen carrier solid before and after the use thereof in a CLC process. FIG. 1D is a scanning electron microscope (SEM) image of a polished section of a sample of the oxygen carrier solid after the use thereof in a CLC process.

FIG. 2A is a graph giving information on the porosity of the oxygen carrier solid. FIG. 2B is a graph representing the conversion of methane as a function of the redox cycles in a CLC process using the oxygen carrier solid. FIG. 2C represents in (a) a SEM image and in (b) an energy dispersive X-ray spectrometry (EDX) mapping of the oxygen carrier solid prior to the use thereof in a CLC process. FIG. 2D is a SEM image of a polished section of a sample of the oxygen carrier solid after the use thereof in a CLC process.

FIG. 3A is a diffractogram obtained by X-ray diffractometry (XRD) of the oxygen carrier solid. FIG. 3B represents in (a) a SEM backscattered electron image and in (b) an EDX mapping of a polished section of the oxygen carrier solid prior to the use thereof in a CLC process. FIG. 3C is a graph giving information on the porosity of the oxygen carrier solid. FIG. 3D represents in (a) a SEM backscattered electron image and in (b) an EDX mapping of a polished section of the oxygen carrier solid after the use thereof in a CLC process. FIG. 3E is a SEM image of a polished section of a sample of the oxygen carrier solid after the use thereof in a CLC process.

FIG. 4A is a graph giving information on the porosity of the oxygen carrier solid. FIG. 4B represents a SEM image of the oxygen carrier solid prior to the use thereof in a CLC process. FIG. 4C represents in (a) a SEM backscattered electron image and in (b) an EDX mapping of a polished section of the oxygen carrier solid after the use thereof in a CLC process.

FIG. 5A is a graph giving information on the porosity of the oxygen carrier solid. FIG. 5B represents a SEM image on a polished section of the oxygen carrier solid prior to the use thereof in a CLC process. FIG. 5C represents a SEM image on a polished section of the oxygen carrier solid after the use thereof in a CLC process.

FIG. 6A is a graph giving information on the porosity of the oxygen carrier solid. FIG. 6B represents a SEM image on a polished section of the oxygen carrier solid prior to the use thereof in a CLC process.

DESCRIPTION OF THE INVENTION

Figure 1A:
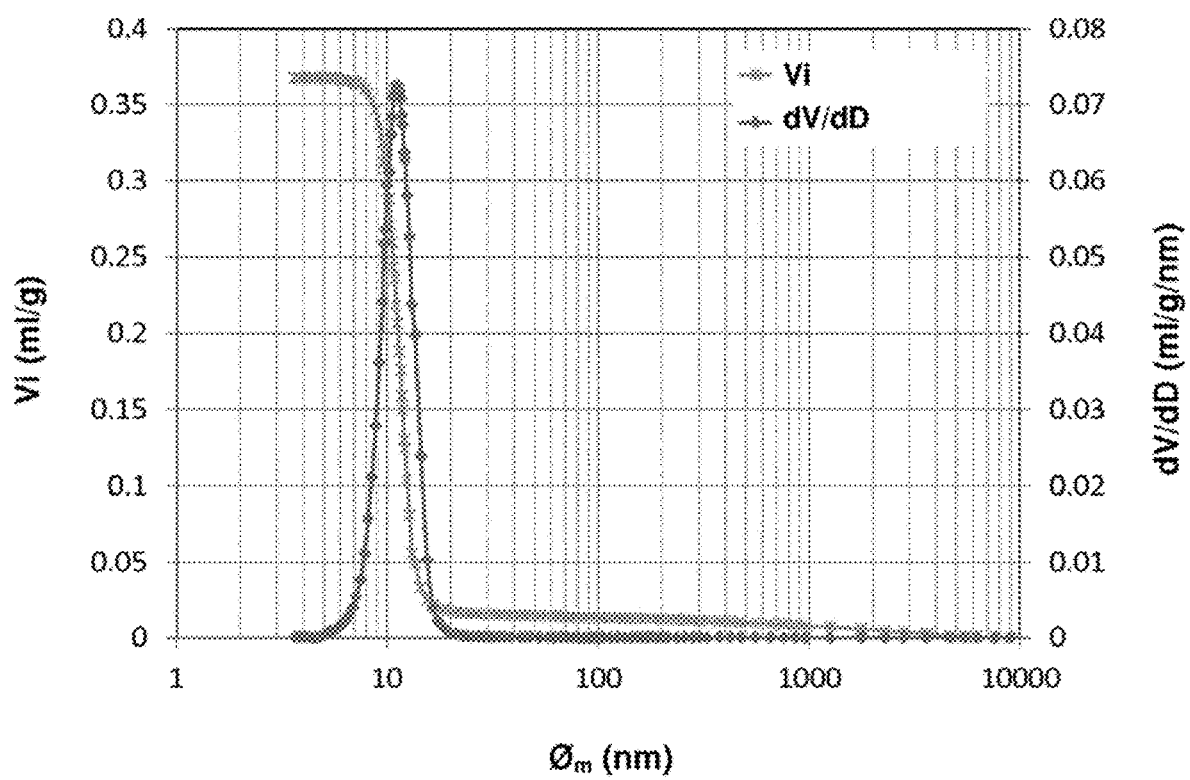
FIGS. 1A, 1B, 1C and 1D relate to an oxygen carrier solid according to example 2 (example not in accordance with the invention).

The objective of the invention is to provide an oxygen carrier solid for a chemical looping redox process, such as a CLC process, but also for other chemical looping redox processes on an active mass such as a chemical looping reforming (CLR) process or a CLOU (chemical looping oxygen uncoupling) process.

The present invention also relates to the preparation and use of the oxygen carrier solid in such processes.

CLC processes generally require two separate reactors in order to carry out firstly in a reduction reactor, the reduction of the active mass by means of a fuel, or more generally a reducing gas, liquid or solid. The effluents from the reduction reactor mainly contain $CO_2$ and water, allowing easy capture of the $CO_2$. Secondly, in the oxidation reactor, restoring the active mass to its oxidized state by contact with air or any other oxidizing gas makes it possible to correlatively generate an energy-carrying hot effluent and a lean nitrogen stream or a nitrogen-free stream (where air is used).

In the present description, reference is above all made to the use of the oxygen carrier solid in a circulating fluidized-bed CLC process, but the oxygen carrier solid according to the invention may also be used in any other type of chemical looping (CLC, CLR, CLOU) redox process in a fixed, moving or ebullated bed, or else in a rotating reactor.

The Oxygen Carrier Solid

The oxygen carrier comprises:
- a redox active mass constituting between 5% and 75% by weight of the oxygen carrier solid, preferably between 10% and 40% by weight, the redox active mass comprising a metal oxide or a mixture of metal oxides and being capable of exchanging oxygen under the redox conditions of said chemical looping redox process;
- a ceramic matrix within which the redox active mass is dispersed, the ceramic matrix constituting between 25% and 95% by weight of the oxygen carrier solid, preferably between 60% and 90% by weight, and the ceramic matrix comprising between 60% and 100% by weight, and preferentially between 80% and 100% by weight, of at least one tectosilicate having a melting point above 1500° C., and preferably a melting point above 1700° C., and between 0% and 40% by weight of at least one oxide, preferably between 0% and 20% by weight of at least one oxide.

According to one embodiment, the ceramic matrix consists essentially of at least one tectosilicate having a melting point above 1500° C., and preferably a melting point above 1700° C. The expression "consists essentially" is understood to mean comprising 100% of said tectosilicate, to within 1%.

In addition to a ceramic matrix comprising at least one feldspar or feldspathoid having a melting point above 1500° C., and preferably a melting point above 1700° C., the oxygen carrier solid according to the invention has a particular porosity which, unexpectedly, makes it possible to limit the migration phenomenon of the active mass within the oxygen carrier particles. This initial texture significantly improves the lifetime of the particles in the chemical looping combustion process and is characterized in that:
- the total pore volume of the oxygen carrier solid Vtot, measured by mercury porosimetry, is between 0.05 and 0.9 ml/g;
- the total pore volume Vtot of the oxygen carrier solid comprises at least 10% of macropores. In other words, the pore volume of the macropores constitutes at least 10% of the total pore volume Vtot of the oxygen carrier solid;
- the size distribution of the macropores within the oxygen carrier solid, measured by mercury porosimetry, is between 50 nm and 7 μm.

It is recalled that according to the IUPAC nomenclature, micropores refer to pores whose size is less than 2 nm, mesopores refer to pores whose size is between 2 and 50 nm, and macropores refer to pores having a size greater than 50 nm.

The "initial texture" is understood to mean the texture before any use in a chemical looping redox process such as CLC.

The total pore volume of the solid is measured by mercury porosimetry, more specifically the measurement relates to the volume of mercury injected when the pressure exerted increases from 0.22 MPa to 413 MPa.

The total pore volume Vtot of the oxygen carrier solid is preferably between 0.1 and 0.5 ml/g, and preferably between 0.1 and 0.4 ml/g.

Preferably, the total pore volume Vtot of the particles is constituted, for at least 50%, by macropores. In other words, the pore volume of the macropores constitutes at least 50% of the total pore volume Vtot of the oxygen carrier solid. The remainder of the total pore volume may either consist of microporosity or mesoporosity in any proportion whatsoever.

The size distribution of the macropores within the particles, measured by mercury porosimetry, is more preferentially between 50 nm and 4 μm, and even more preferably between 200 nm and 1 μm.

The reason(s) why this initial macroporous texture of the oxygen carrier solid minimizes the migration of the active mass within the particles is not yet explained. Without being bound to a particular theory, the inventors attribute this phenomenon, at least partially, to the fact that the diffusion limitations, usually reported for the mesoporous particles according to the prior art, are largely minimized because of the particularly open texture of the particles according to the invention. The gases can easily access the active mass dispersed within the ceramic matrix, limiting the mobility of the active mass due to concentration gradients, particularly during the oxidation of the particles. Indeed it is known that metal cations generally migrate through the primary oxide layer formed during the oxidation of a reduced metal particle (S. Mrowec, Z. Grzesik, "Oxidation of nickel and transport properties of nickel oxide", J. Phys. Chem. Solids, 64, 1651, 2004), since the diffusion rate of the metal cations in the oxide layer is higher than that of the oxygen anion ($O^{2-}$). In addition, the nature of the ceramic matrix of the oxygen carrier solid comprising tectosilicates with a high melting point (above 1500° C.), such as celsian, would make it possible to minimize the particle densification phenomenon sometimes observed in the prior art (see examples 5 and 6), which would limit the evolution of the porosity of the particles during the redox cycles.

The Ceramic Matrix

The ceramic matrix comprises at least one tectosilicate which is preferably a feldspar or a feldspathoid, and may be formed solely by such a tectosilicate.

Tectosilicates are silicates for which the arrangement of the $[SiO_4]^{4-}$ tetrahedra consists of a three-dimensional framework where each oxygen of the vertices of the tetrahedra is shared with the neighboring tetrahedra. The basic $[SiO_4]^{4-}$ tetrahedra that are found in all the silicates are welded by their four vertices and each oxygen is bonded to two cations. The chemical formula of the other tectosilicates can be derived from that of silica, generalized as n $TO_2$, where T denotes the tetrahedral cation, essentially silicon $[SiO_4]^{4-}$ or aluminum $[AlO_4]^{5-}$. The negative charge, which results from the replacement of silicon by aluminum in the tetrahedra, is compensated for by the presence of $M^{m+}$ cations ($K^+$, $Na^+$, $Mg^{2+}$, $Ca^{2+}$, $Sr^{2+}$, $Ba^{2+}$, etc.) in the cavities of the structure. This characteristic is common to feldspars, feldspathoids and zeolites, but the topology is different in the three cases.

Feldspars are aluminous, calcic or alkali (sodium or potassium) tectosilicates.

Feldspathoids are tectosilicates that are highly silica-deficient.

The ceramic matrix comprises at least one feldspar selected from the list consisting of celsian, slawsonite, anorthite, or one feldspathoid, kalsilite. Preferably, the ceramic matrix consists essentially of at least one feldspar selected from the list consisting of celsian, slawsonite, anorthite.

Feldspars containing alkaline-earth metal cations ($Ca^{2+}$, $Sr^{2+}$ and $Ba^{2+}$), such as celsian, slawsonite, anorthite, have advantageous mechanical, thermal and electrical properties. In particular, their coefficient of thermal expansion is very low, for example of $2.29 \times 10^{-8}$ $K^{-1}$ for monoclinic celsian, which makes it possible to limit the mechanical stresses of deformation for use at high temperature, in particular in chemical looping redox processes such as CLC.

In addition, they have a high melting point, above 1500° C. (1550° C., 1700° C. and 1760° C., respectively for anorthite, slawsonite and celsian), which is advantageous in the context of chemical looping redox processes such as CLC where the temperature reached by the particles of the oxygen carrier is higher than that of the fluidizing gas, sometimes up to 120° C. (Guo, X Y; Sun Y L, Li, R., Yang, F. "Experimental investigations on temperature variation and inhomogeneity in a packed bed CLC reactor of large particles and low aspect ratio", Chem. Eng. Sci. 107, 266, 2014.). The melting point of feldspars and feldspathoids strongly depends on the nature of the $M^{m+}$ cation, on the Si/Al ratio and on the arrangement of the tetrahedra in the crystallographic phase.

According to a preferred embodiment, the ceramic matrix comprises celsian. Advantageously, the ceramic matrix consists essentially of celsian. Celsian is a feldspar which advantageously has a high mechanical strength and a very low coefficient of thermal expansion. It also has a high melting point (1760° C.).

Table 1 below lists the feldspars and feldspathoids mentioned that may make up the ceramic matrix, and also examples of other feldspathoids whose melting point is below 1500° C.

TABLE 1

| | Name | Chemical formula | Melting point (° C.) |
|---|---|---|---|
| Feldspathoids | albite | $NaAlSi_3O_8$ | 1120 |
| | orthoclase | $KAlSi_3O_8$ | 1150 |
| | nepheline | $(Na,K)AlSiO_4$ | 1230 |
| | kalsilite | $KAlSiO_4$ | 1750 |
| Feldspars | celsian | $BaAl_2Si_2O_8$ | 1760 |
| | slawsonite | $SrAl_2Si_2O_8$ | 1700 |
| | anorthite | $CaAl_2Si_2O_8$ | 1550 |

The ceramic matrix of the oxygen carrier solid according to the invention may also consist of a mixture of one or more tectosilicates and of other oxides customarily used as catalyst supports in petroleum refining processes. Thus, the ceramic matrix may comprise at least one oxide selected from the list consisting of alumina, metal aluminates, silica, silicates, aluminum silicates, aluminosilicates, titanium dioxide, perovskites and zirconia.

In the present description the term oxide covers a mixed oxide, i.e. a solid resulting from the combination of $O^{2-}$ oxide ions with at least two cationic elements (for example calcium aluminate $CaAl_2O_4$ or magnesium aluminate $MgAl_2O_4$). A mixture of oxides is understood to mean at least two different solid compounds each being an oxide.

According to the invention, the ceramic matrix is obtained from a zeolite-based precursor.

Zeolites are crystalline microporous solids of the family of aluminosilicates that can be found frequently in nature. These materials can also be synthesized, for instance frequently for use as adsorbents or catalysts in the chemical industry. Zeolites have three-dimensional structures formed by the arrangement of $[SiO_4]^{4-}$ and $[AlO_4]^{5-}$ tetrahedra bonded by bridging oxygen atoms. The electroneutrality of the assembly is ensured by the presence of one or more exchangeable compensating cations. The general formula of a zeolite is $M_{x/m}Al_xSi_{192-x}O_{384} \cdot yH_2O$ with $M^{m+}$ being the extra-framework cation having a charge of +m.

It is known that celsian can be obtained from a barium-exchanged zeolite. In the case of barium-exchanged A, X and LSX zeolites, a high temperature treatment, i.e. above 1000° C., leads to the formation of celsian, according to the following sequence: zeolite→amorphous phase→hexagonal celsian→monoclinic celsian. The formation of monoclinic celsian from pure BaX ("BaX" for barium-exchanged X zeolite) requires a 24 h heat treatment at 1550° C. (S. Esposito et al., A comparative study of the thermal transformations of Ba-exchanged zeolites A, X and LSX, J. Eur. Ceram. Soc., 24, 2004, 2689). After a 28 h heat treatment at 1100° C., the hexagonal celsian is still predominantly present, but an onset of crystallization of monoclinic celsian is observed. In addition to the nature of the zeolite structure, the presence of various alkali metal cations (for example Na$^+$, Li$^+$, K$^+$) has an influence on the temperatures at which these various phase transitions take place. According to Esposito et al. 2004, these differences in behavior are related to the various degrees of compositional homogeneity of the mixture in the amorphous phases obtained during the heat treatment of the microporous structure of the zeolites.

The oxygen carrier solid according to the invention is prepared from various zeolites having a low Si/Al ratio, which are impregnated with a precursor of a redox active mass, typically a metal nitrate, and which decompose by calcination, preferably in air and at a temperature between 450° C. and 1400° C., to form the redox active mass (e.g. an oxide of the metal nitrate) dispersed in a ceramic matrix composed of tectosilicates or mixtures of tectosilicates, depending on the nature of the cation or mixture of cations in the zeolite cages and on the Si/Al ratio of the zeolite. The melting temperature of the ceramic matrix depends on the nature of the $M^{m+}$ cation, on the Si/Al ratio and on the arrangement of the tetrahedra in the crystallographic phase. The preparation of the oxygen carrier solid according to the invention is described in detail later on in the description.

The Redox Active Mass

The oxygen carrier solid according to the invention comprises a redox active mass which comprises, and preferably consists of, at least one metal oxide included in the list consisting of the oxides of Fe, Cu, Ni, Mn and Co, a perovskite having redox properties, preferably a perovskite of formula $CaMnO_3$, a metal aluminate spinel having redox properties, preferably a metal aluminate spinel of formula $CuAl_2O_4$ or of formula $CuFe_2O_4$. The spinel of formula $CuFe_2O_4$ is a cuprospinel.

Preferably, the redox active mass comprises at least one copper oxide, for example of formula CuO, and more preferentially consists of at least one copper oxide, for example of formula CuO.

According to the invention, the oxygen carrier solid advantageously has an active mass dispersed within the ceramic matrix, typically an initial distribution of the active mass which is relatively homogeneous, and the migration of the active mass within the particles of the oxygen carrier solid is minimized during the redox cycles of the chemical looping redox process, as is illustrated by some examples later on in the description.

The redox active mass is capable of exchanging oxygen under the redox conditions of the chemical looping redox process. The active mass is reduced according to the reaction (1) already described above, during a reduction step in contact with a hydrocarbon feedstock, and is oxidized according to reaction (2) or (3) already described above, during an oxidation step in contact with an oxidizing gas.

The oxygen storage capacity of the redox active mass is advantageously, depending on the type of material, between 1% and 15% by weight. Advantageously, the amount of oxygen actually transferred by the metal oxide is between 1 and 3% by weight, which makes it possible to use only a fraction of the oxygen transfer capacity.

Form of the Oxygen Carrier Solid

The oxygen carrier solid according to the invention is preferably in the form of particles, which can be fluidized in the chemical looping redox process, in particular can be used in a circulating fluidized bed. They may be fluidizable particles (fluidizable powder, generally referred to as "fluidizable carrier") belonging to groups A, B or C of the Geldart classification (D. Geldart. "Types of gas fluidization", Powder Technol. 7(5), 285-292, 1973), and preferably the particles belong to group A or group B of the Geldart classification, and preferably to group B of the Geldart classification.

Preferably, the particles of the oxygen carrier solid have a particle size such that more than 90% of the particles have a size of between 50 μm and 600 μm, more preferentially a particle size such that more than 90% of the particles have a size of between 80 μm and 400 μm, even more preferentially a particle size such that more than 90% of the particles have a size of between 100 μm and 300 μm, and even more preferentially a particle size such that more than 95% of the particles have a size of between 100 μm and 300 μm.

Preferably, the particles of the oxygen carrier solid have a grain density of between 500 kg/m$^3$ and 5000 kg/m$^3$, preferably a grain density of between 800 kg/m$^3$ and 4000 kg/m$^3$, and even more preferentially a grain density of between 1000 kg/m$^3$ and 3000 kg/m$^3$.

The particles of the oxygen carrier solid are preferably substantially spherical.

The size distribution and morphology of the particles for use in another type of chemical looping process (CLC, CLR, CLOU) in a fixed bed, in a moving bed or in a rotating reactor are suitable for the process envisaged. For example, in the case of a use of the oxygen carrier solid in a process using a fixed bed or rotating reactor technology, the preferred size of the particles is greater than 400 μm, in order to minimize the pressure drops in the reactor(s), and the morphology of the particles is not necessarily spherical. The morphology is dependent on the shaping mode, for example in the form of extrudates, beads, monoliths or particles of any geometry obtained by grinding larger particles. In the case of a shaping of monolithic type, the oxygen carrier solid, in the form of particles, is deposited on the surface of the ceramic monolith channels by the coating methods known to those skilled in the art or else the monolith itself consists of the particles according to the invention.

The size of the particles can be measured by laser particle size analysis.

The size distribution of the particles is preferably measured using a laser particle size analyzer, for example Malvern Mastersizer 3000, preferably by the liquid route, and using Fraunhofer theory.

Preparation of the Oxygen Carrier Solid

The oxygen carrier solid is prepared according to a process comprising the following steps:

Step (A): Preparation of a Precursor of a Ceramic Matrix

Step (A) comprises:

a1) the preparation of a macroporous zeolite material, said material comprising zeolite crystals with a number-average diameter of less than or equal to 3 μm, and preferably a number-average diameter of between 0.4 μm and 2 μm, and more preferentially still a number-average diameter of between 0.5 μm and 1.7 μm; and a2) a cation exchange of said macroporous zeolite material with a solution of precursor ions, the precursor ions being selected to form a tectosilicate with a melting point>1500° C. of the ceramic matrix at the end of step (D), said cation exchange being followed by a washing of said macroporous zeolite material, to obtain said precursor of the ceramic matrix.

Step a1)

Preferably, step a1) for preparing a macroporous zeolite material comprises the following steps:
- a'1) agglomerating the zeolite crystals with a clay binder to form a zeolite agglomerate;
- a'2) shaping of the zeolite agglomerate obtained in step a'1) to produce particles, followed by a drying of said particles, and optionally followed by a screening and/or cycloning step;
- a'3) calcining the particles of the zeolite agglomerate obtained in step a'2) at a temperature between 500° C. and 600° C. to produce the macroporous zeolite material in the form of particles. The particles produced have sufficient mechanical strength for their subsequent use;
- a'4) optionally zeolitizing the clay binder by bringing the product resulting from step a'3) into contact with an alkali metal basic aqueous solution, followed by washing.

The clay binder is an agglomeration binder intended to ensure the cohesion of the crystals in the form of particles. This binder may also help to impart mechanical strength to the particles so that they can withstand the mechanical stresses to which they are subjected during their use within chemical looping redox units.

The proportions of agglomeration binder and of zeolite used may typically be from 5 parts to 20 parts by weight of binder per 95 parts to 80 parts by weight of zeolite.

During step a1), in addition to the zeolite crystals and the clay binder, the zeolite crystals may be mixed with at least one oxide selected from the list consisting of alumina, metal aluminates, silica, silicates, aluminum silicates, aluminosilicates, titanium dioxide, perovskites and zirconia. Thus, at the end of the process an oxygen carrier solid will be obtained that comprises a non-zero amount, and less than 40%, preferably less than 20%, of oxide in the ceramic matrix other than the tectosilicate(s) having a melting point above 1500° C.

Alternatively, such an oxide could be formed, in the desired amounts, at the end of the treatments of the zeolite agglomerate and of the precursor of the ceramic matrix, without adding said oxide to the zeolite crystals during step (A).

During step a1), it is also possible to mix the zeolite crystals with a pore-forming agent intended to increase the macroporosity of the macroporous zeolite material.

During step a1), it is also possible to mix the zeolite crystals both with at least one of the abovementioned oxides and with a pore-forming agent.

During step a1), other additives may also be used, intended to facilitate the agglomeration and/or to improve the hardening and/or increase the macroporosity of the agglomerates formed.

Advantageously, the zeolitic crystals comprise at least one zeolite with an Si/Al molar ratio of between 1.00 and 1.50, and preferably at least one zeolite selected from A, X, LSX and low-silica EMT zeolites. The A zeolites are of LTA structural type, and have an Si/Al ratio=1. The X zeolites are of FAU structural type and have an Si/Al ratio of between 1 and 1.5, as is the case for the LSX (Low Silica X) zeolite. The low-silica EMT zeolites are of EMT structural type and have an Si/Al ratio of between 1.0 and 1.4 (Mintova et al., Chem. Mater., 24, 4758-4765, 2012, and Science, January 2012, 335, 70-73). Those skilled in the art can refer to the book "Atlas of zeolite framework types", 6th revised edition, 2007, Ch. Baerlocher, W. M. Meier, D. H. Olson to obtain the characteristics of these types of zeolites. They may therefore be crystals formed by only one of the zeolites mentioned, or by a mixture of said zeolites, and preferably by only one of the zeolites mentioned, in particular X or LSX zeolite.

The A, X, LSX and low-silica EMT zeolite crystals may be derived from synthesis and the compensating cations are mainly, or even exclusively, sodium cations (for example NaX (or 13X), NaA (or 4A) crystals), but using crystals that have undergone one or more cation exchanges, between the synthesis in sodium form and the use thereof in step a1) does not depart from the scope of the invention.

The estimation of the number-average diameter of the X zeolite crystals used in step a1) and of the X zeolite crystals contained in the agglomerates is preferably carried out by observation with a scanning electron microscope (SEM) or by observation with a transmission electron microscope (TEM). In order to estimate the size of the zeolite crystals on the samples, a set of images is produced at a magnification of at least 5000. The diameter of at least 200 crystals is then measured using dedicated software, for example the Smile View software from the LoGraMi publisher. The accuracy is of the order of 3%.

The optional step a'4) of zeolitizing the clay binder makes it possible to convert all or part of the binder into zeolite, preferably into zeolite with an Si/Al molar ratio of between 1.00 and 1.50, and preferably into A, X, LSX or low-silica EMT zeolite, in order to obtain a macroporous zeolite material consisting essentially of zeolite, the non-zeolite phase being typically in an amount of less than 5%, and corresponding to non-zeolitized residual binder or any other amorphous phase after zeolitization, while maintaining or even improving the mechanical strength of the macroporous zeolite material, as taught by patents FR 2 903 978 and FR 2 925 366.

The clay agglomeration binder used in step a'1) comprises, and preferably consists of, a clay or a mixture of clays, to which a source of silica may be added. These clays are preferably selected from kaolins, kaolinites, nacrites, dickites, halloysites, attapulgites, sepiolites, montmorillonites, bentonites, illites and metakaolins, and also mixtures of two or more thereof in any proportion. In the case of the optional zeolitizing step a'4), the clay agglomeration binder used in step a'1) contains at least 80%, preferably at least 90%, more preferably at least 95%, more particularly at least 96% by weight of zeolitizable clay and may also contain other minerals such as bentonite, attapulgite, and the like. A zeolitizable clay is understood to mean a clay or a mixture of clays which are capable of being converted into zeolite material, most often by the action of an alkali metal basic solution. Zeolitizable clay generally belongs to the family of kaolins, kaolinites, nacrites, dickites, halloysites and/or metakaolins. Kaolin is preferred and most commonly used.

After the drying in step a'2), the calcining in step a'3) is carried out at a temperature generally of between 500° C. and 600° C., for example at 550° C., and makes it possible to convert zeolitizable clay, typically kaolin, into metakaolin which may afterwards be converted into zeolite during the optional zeolitizing step (step a'4)). The principle thereof is disclosed in "Zeolite Molecular Sieves" by D. W. Breck, John Wiley and Sons, New York, (1973), p. 314-315. The zeolitization of the agglomeration binder is carried out according to any method currently well known to those skilled in the art and may for example be carried out by immersion of the product from step a'3) in a generally aqueous, alkali metal basic solution, for example an aqueous solution of sodium hydroxide and/or of potassium hydroxide.

At the end of step a1) the macroporous zeolite material contains alkali metal or alkaline-earth metal cations, and more generally sodium and/or potassium cations.

The macroporous zeolite material at the end of step a1) may also be obtained, alternatively to the series of steps a'1) to a'4) described above, by any alternative method leading to zeolite particles, and in particular by the method described in U.S. Pat. No. 4,818,508 starting from agglomerates of zeolitizable clay subjected to zeolitization by the action of an alkali metal basic solution.

Step a2)

The cation exchange (step a2) may be carried out with a solution comprising alkali metal ions, preferably $K^+$ ions, or alkaline-earth metal ions, and preferably with a solution comprising alkaline-earth metal ions.

The cation exchange is more preferably carried out with a solution comprising ions selected from $Ba^{2+}$, $Sr^{2+}$ and $Ca^{2+}$ ions, and even more preferentially with a solution comprising $Ba^{2+}$ ions.

Preferably, the solution used is an aqueous solution in which a salt, preferably a barium salt such as barium chloride $BaCl_2$, a strontium salt such as strontium chloride $SrCl_2$ or a calcium salt such as calcium chloride $CaCl_2$, and preferably the barium salt $BaCl_2$, is dissolved.

Step a2) of cation exchange of the zeolite is carried out by bringing the macroporous zeolite material resulting from step a1), in particular the macroporous zeolite material in the form of particles resulting from step a'3) or a'4), into contact with an alkali metal or alkaline-earth metal salt, such as $BaCl_2$, in aqueous solution, preferably at a temperature between room temperature and 100° C., and preferably at a temperature between 80° C. and 100° C. To quickly obtain a cation, e.g. barium, exchange rate that is high, i.e. greater than 90%, it is preferred to operate with a large excess of the exchange cation relative to the cations of the zeolite that it is desired to exchange.

Chemical analysis of the precursor of the ceramic matrix resulting from step a2) or of the zeolite crystals used in step a1) is carried out according to conventional techniques, in particular by X-ray fluorescence as described in standard NF EN ISO 12677:2011 on a wavelength dispersive spectrometer (WDXRF), for example Tiger S8 from Bruker, or by inductively coupled plasma-optical emission spectrometry (ICP-OES) according to the standard UOP 961-12.

The cation exchange of the zeolites may be carried out without destroying the zeolite structure. However, it is known that complete destruction of the zeolite structure may be obtained if it is sought to dehydrate the zeolite exchanged, such as for example in the case of zeolite A thus exchanged with barium (Howard S. Sherry, Harold F. Walton, "The Ion-Exchange Properties of Zeolites". II. Ion Exchange, Synthetic Zeolite Linde 4-A. J. Phys. Chem., Vol. 71, No. 5, p. 1457, 1967). Thus, the precursor of the ceramic matrix obtained at the end of the optional heat treatment step a3) may be completely or partially amorphous, especially in the case where the A zeolite is used in step a1), or when the temperature of the heat treatment of step a3) is too high to retain the zeolite structure.

Step a3)

The preparation of the precursor of the ceramic matrix during step (A) may further comprise an additional step a3) of heat treatment of the macroporous zeolite material obtained in step a2). This heat treatment comprises a step of drying at a temperature of between 100° C. and 400° C.

Step (B): Impregnation of the Precursor of the Ceramic Matrix

The precursor of the ceramic matrix obtained in step (A) is impregnated with a precursor compound of a redox active mass.

The impregnation may be carried out with an aqueous or organic solution containing at least one soluble precursor compound of copper, nickel, cobalt, iron or manganese.

Preferably, the impregnation is carried out with an aqueous solution containing at least one precursor compound of the redox active mass selected from the list consisting of the nitrates of the following formulae: $Cu(NO_3)_2.xH_2O$, $Ni(NO_3)_2.xH_2O$, $Co(NO_3)_2.xH_2O$, $Fe(NO_3)_3.xH_2O$, $Mn(NO_3)_2.xH_2O$.

Advantageously, copper nitrate $Cu(NO_3)_2.xH_2O$ is selected to carry out this impregnation, in order to obtain a redox active mass of copper oxide(s), for example a copper oxide of formula CuO, to form the oxygen carrier solid.

The amount of precursor of the redox active mass used for the impregnation stage is selected so that the redox active mass constitutes between 5% and 75% by weight of the oxygen carrier solid.

The impregnation may be carried out in one or more successive steps.

If the impregnation is carried out in several successive steps, intermediate steps of drying at a temperature of between 30° C. and 200° C. and/or of calcining at a temperature of between 200° C. and 600° C. are preferably carried out.

Step (C): Shaping of the Precursor of the Ceramic Matrix

The precursor of the ceramic matrix is formed into particles during step (a1) or at the end of step (B).

The shaping in step a1) has been described above. This is the shaping in step a'2) of the zeolite agglomerate obtained in step a1). During this step a'2) the shaping is followed by a drying of the particles, which is optionally followed by a screening and/or cycloning step.

During this step (C), the precursor of the ceramic matrix is shaped so as to obtain particles having a particle size such that more than 90% of the particles have a size of between 100 μm and 500 μm.

If a circulating fluidized bed implementation is envisaged for the chemical looping redox process using the oxygen carrier solid, it will be preferable to carry out a shaping so as to obtain a size distribution of the particles of the zeolite agglomerate, or of the precursor of the ceramic matrix from step (B), such that said particles belong to class A or class B of the Geldart classification.

Preferably, the shaping is carried out so as to produce particles having the following particle size: more than 90% of the particles have a size of between 100 μm and 500 μm, and a grain density of between 500 kg/m³ and 5000 kg/m³. Very preferably, the shaping is carried out so as to produce particles having the following particle size: more than 90% of the particles have a size of between 100 μm and 300 μm, and a grain density of between 800 kg/m³ and 4000 kg/m³. Even more preferably, the shaping is carried out so as to produce particles having the following particle size: more than 95% of the particles have a size of between 100 μm and 300 μm, and a grain density of between 1000 kg/m³ and 3000 kg/m³.

The shaping, which may directly follow the agglomeration step a'1), may be carried out by any technique known to those skilled in the art, such as extrusion, compaction, agglomeration on a granulating plate, a granulating drum, wet or dry granulation, etc., and preferably by granulation or any other technique making it possible to obtain particles of spherical shape.

The shaping may optionally comprise a screening and/or cycloning step, in order to obtain agglomerates of the desired particle size.

Step (D): Drying of the Precursor of the Ceramic Matrix

The precursor of the impregnated ceramic matrix in the form of particles obtained at the end of all of the steps (A), (B) and (C) is subjected to a drying step.

This drying is preferably carried out in air or in a controlled atmosphere (controlled relative humidity, under nitrogen), at a temperature of between 30° C. and 200° C. A controlled atmosphere is understood to mean, for example, with a controlled relative humidity or under nitrogen.

More preferentially, the drying is carried out in air at a temperature of between 100° C. and 150° C.

Step (E): Calcination of the Precursor of the Ceramic Matrix

The precursor of the impregnated and dried ceramic matrix obtained in step (D) is calcined to obtain the oxygen carrier solid in the form of particles.

This calcination is preferably carried out in air between 450° C. and 1400° C., more preferentially between 600° C. and 1000° C., and even more preferentially between 700° C. and 900° C.

This calcination may be carried out for a period of 1 to 24 hours, and preferably for a period of 5 to 15 hours.

Advantageously, a temperature rise ramp of between 1° C./min and 50° C./min, and preferably between 5° C./min and 20° C./min, is applied to achieve the given calcination temperature. The time for implementing this temperature ramp is not included in the calcination time ranges indicated above.

The calcination enables the formation of the tectosilicate(s) of the ceramic matrix of the oxygen carrier solid in the form of particles, within which matrix the redox active mass is dispersed.

It also appears that the calcination step (E) has a limited impact on the initial macroporous structure of the particles, even more limited when the calcination is carried out at a temperature between 700° C. and 900° C. A small increase in the diameter of the macropores and a small decrease in total pore volume may be observed.

According to a preferred embodiment, the preparation of an oxygen carrier of formula $CuO/BaAl_2Si_2O_8$ according to the invention is carried out according to the following steps:

Firstly, step (A) of preparing a precursor of a ceramic matrix of celsian in the form of particles is carried out.

The precursor of the ceramic matrix $BaAl_2Si_2O_8$ is a macroporous zeolite agglomerate consisting essentially of zeolite with a low Si/Al atomic ratio, i.e. with an Si/Al ratio of less than 1.5 (and greater than 1). The zeolite crystals may comprise a zeolite selected from A, X, LSX and low-silica EMT zeolites, alone or as a mixture. The zeolites of the agglomerate are exchanged with barium. The precursor of the ceramic matrix $BaAl_2Si_2O_8$ is prepared according to the following steps:

a1) the preparation of a macroporous zeolite material comprising an agglomeration of zeolite crystals having an Si/Al atomic ratio of between 1.00 and 1.50, for example A, X, LSX or low-silica EMT zeolite, alone or in a mixture, with a number-average diameter of less than or equal to 3 μm, preferably between 0.4 μm and 2 μm, and preferably between 0.5 μm and 1.7 μm, with a binder based on a clay or on a mixture of clays (step a1), and shaping to form particles, then a drying of the particles (step a'2), followed by a calcining (step a'3).

A possible zeolitization of the clay binder by the action of an alkali metal basic solution can be carried out (step a'4). Alternatively, the shaping in the form of particles is carried out subsequently, after the impregnation step (B);

a2) the cation exchange of the particles of the macroporous zeolite material resulting from step a1) by bringing into contact with a solution of barium ions, followed by washing of the product thus treated. The barium exchange of the cations of the zeolite is carried out by bringing the macroporous zeolite material resulting from step a1), in particular the macroporous zeolite material in particulate form resulting from step a'3) or a'4), into contact with a barium salt, such as $BaCl_2$, in aqueous solution at a temperature between room temperature and 100° C., and preferably between 80° C. and 100° C. To rapidly obtain a high degree of barium exchange, i.e. greater than 90%, it is preferred to operate with a large excess of barium relative to the cations of the zeolite that it is desired to exchange, typically such that the $BaO/Al_2O_3$ ratio is of the order of 10 to 12 by performing successive exchanges. The degree of exchange by the barium ions is determined by the ratio between the number of moles of barium oxide, BaO, and the number of moles of all the oxides of alkali metal and alkaline-earth metal ions (typically the number of moles of $BaO+K_2O+Na_2O$). The barium exchange of X, LSX, or A or low-silica EMT zeolites is achieved without destruction of the zeolite structure.

a3) the optional heat treatment of the exchanged macroporous zeolite material resulting from step a2), comprising a step of drying at a temperature of between 100° C. and 400° C. The precursor of the ceramic matrix obtained at the end of this step a3) may be completely or partially amorphous, especially in the case where the A zeolite is used in step a1).

The conditions and details regarding the products and materials used in the sub-steps of step (A) are not repeated here and correspond to those described more generally above.

Next, step (B) of impregnating the precursor of the ceramic matrix of celsian is carried out: the precursor of the ceramic matrix, preferably shaped according to step (C) already described, is impregnated with an aqueous or organic solution containing at least one soluble precursor of copper, nickel, cobalt, iron and/or manganese, as described in detail above.

Then step (D) of drying the impregnated precursor of the ceramic matrix of celsian in the form of particles is carried out. This drying step is in accordance with what has been described generally above.

Finally, the calcination step (E), as already described, of the particles from step (D) is carried out in order to form the oxygen carrier comprising a matrix of celsian $BaAl_2Si_2O_8$ within which the CuO redox active mass is dispersed, and having the specific porous texture described above. It appears that the impregnation of the shaped and barium-exchanged zeolite with one or more metal precursors of the redox active mass, such as precursors of Cu, Ni, Co, Fe and/or Mg, does not modify the conversion sequence of the zeolite structure mentioned by Esposito et al. 2004, but the phase transition temperatures are lowered. In fact, a mixture of hexagonal and monoclinic celsian with tenorite (CuO) is obtained after calcining for 12 hours at 800° C. of the BaX zeolite precursor impregnated with $Cu(NO_3)_2$, while a calcination of 6 h at 1100° C. is necessary to obtain hexagonal celsian from the BaX zeolite precursor not impregnated with copper nitrate, and 24 h at 1550° C. to obtain monoclinic celsian.

Use of the Oxygen Carrier Solid

The oxygen carrier solid is intended to be used in a chemical looping redox process.

The invention thus relates to a chemical looping redox process using the oxygen carrier solid as described, or prepared according to the preparation process as described.

Advantageously, the oxygen carrier solid described is used in a CLC process of a hydrocarbon feedstock, in which the oxygen carrier solid is in the form of particles and circulates between at least one reduction zone and one oxidation zone both operating in a fluidized bed.

The temperature in the reduction zone and in the oxidation zone is between 400° C. and 1400° C., and preferably between 600° C. and 1100° C., and even more preferentially between 800° C. and 1100° C.

The hydrocarbon feedstock treated may be a solid, liquid or gaseous hydrocarbon feedstock: gaseous fuels (e.g.: natural gas, syngas, biogas), liquid fuels (e.g.: fuel oil, bitumen, diesel, gasolines, etc.), or solid fuels (e.g.: coal, coke, petcoke, biomass, oil sands, etc.).

The operating principle of the CLC process in which the oxygen carrier solid described is used is as follows: a reduced oxygen carrier solid is brought into contact with a stream of air, or any other oxidizing gas, in a reaction zone referred to as an air reactor (or oxidation reactor). This results in a depleted air stream and a stream of reoxidized particles of the oxygen carrier solid. The stream of oxidized oxygen carrier particles is transferred to a reduction zone referred to as a fuel reactor (or reduction reactor). The stream of particles is brought into contact with a fuel, typically a hydrocarbon feedstock. This results in a combustion effluent and a stream of reduced oxygen carrier particles. The CLC plant may include various pieces of equipment, for heat exchange, pressurization, separation or possible recirculations of material around the air and fuel reactors.

In the reduction zone, the hydrocarbon feedstock is brought into contact, for example cocurrently, with the oxygen carrier solid in the form of particles comprising the redox active mass in order to carry out the combustion of said feedstock by reducing the redox active mass. The redox active mass $M_xO_y$, M representing a metal, is reduced to the $M_xO_{y-2n-m/2}$ state, by means of the hydrocarbon feedstock $C_nH_m$, which is correlatively oxidized to give $CO_2$ and $H_2O$, according to the reaction (1) already described, or optionally to give a $CO+H_2$ mixture depending on the proportions used and the nature of the metal M. The combustion of the feedstock in contact with the active mass is carried out at a temperature generally between 400° C. and 1400° C., preferentially between 600° C. and 1100° C., and even more preferably between 800° C. and 1100° C. The contact time varies depending on the type of combustible feedstock used. It typically varies between 1 second and 10 minutes, for example preferably between 1 and 5 minutes for a solid or liquid feedstock, and for example preferably from 1 to 20 seconds for a gaseous feedstock.

A mixture comprising the gases from the combustion and the particles of the oxygen carrier solid is discharged, typically at the top of the reduction zone. Gas/solid separation means, such as a cyclone, make it possible to separate the combustion gases from the solid particles of the oxygen carrier in their most reduced state. The latter are sent to the oxidation zone to be re-oxidized, at a temperature generally between 400° C. and 1400° C., preferably between 600 and 1100° C., and even more preferentially between 800° C. and 1100° C.

In the oxidation reactor, the active mass is restored to its oxidized state $M_xO_y$, in contact with the air, according to reaction (2) already described (or according to reaction (3) if the oxidizing gas is $H_2O$), before returning to the reduction zone, and after having been separated from the oxygen-depleted air discharged at the top of the oxidation zone 100.

The active mass, passing alternately from its oxidized form to its reduced form and vice versa, follows a redox cycle.

The disclosed oxygen carrier solid may also be used in another chemical looping redox process such as a CLR process or a CLOU process.

The technology used in the chemical looping redox process is preferably that of the circulating fluidized bed, but is not limited to this technology, and can be extended to other technologies such as fixed bed, moving bed or ebullated bed technology, or else rotating reactor technology.

EXAMPLES

The advantage of the oxygen carrier solids according to the invention in the chemical looping processes, in particular CLC, in particular the minimization of the migration of the active mass within the particles during the redox cycles, is disclosed through the examples 1 to 7 below.

Examples 2, 3, 5 and 6 relate to oxygen carrier solids not in accordance with the invention. Examples 4 and 7 relate to oxygen carrier solids in accordance with the invention.

Example 1: Aging Test for Oxygen Carrier Solids in a Batch Fluidized Bed

The aging of the oxygen carrier solids in a batch fluidized bed was carried out in a unit consisting of a quartz reactor, an automated system for supplying the reactor with gas and a system for analyzing the gases leaving the reactor.

This aging test approximates the conditions of use of the oxygen carrier solid in a chemical looping redox process, in particular a chemical looping combustion redox process.

The gases ($CH_4$, $CO_2$, $N_2$, air) are distributed by mass flow meters. For safety reasons, a nitrogen purge is carried out after each reduction period and oxidation period.

The height of the quartz reactor is 30 cm, with a diameter of 4 cm in its lower part (around 24 cm from the top), and of 7 cm in its upper part. A quartz frit is placed at the bottom of the reactor to ensure the distribution of the gases and a good fluidization of the particles. Another frit is placed in the upper part of the reactor to prevent the loss of fines during the test. The reactor is heated using an electric furnace. Part of the gas leaving the reactor is pumped to the gas analyzers, cooled to condense most of the water formed during the reduction and then dried using calcium chloride. The gas concentrations are measured using nondispersive infrared analyzers for CO, $CO_2$ and $CH_4$, a paramagnetic analyzer for oxygen, and a TCD detector for hydrogen.

Standard test conditions: 100 grams of particles are introduced into the quartz reactor and then heated to 900° C. in a stream of air (60 Nl/h). When the temperature of the bed is stabilized at 900° C. in air, 250 cycles are carried out according to the following steps:
1—Nitrogen purge (60 Nl/h)
2—Injection of a $CH_4/CO_2$ mixture (30 Nl/h/30 Nl/h) (reduction of the particles)

3—Nitrogen purge (60 Nl/h)

4—Injection of air (60 Nl/h) (oxidation of the particles)

The conversion of the oxygen carrier solid (amount of oxygen supplied by the oxygen carrier solid to carry out the methane conversion, expressed in % by weight of the oxidized oxygen carrier) is calculated from the gas conversion data, and the reduction time (step 2 of the cycle) is adjusted after the first cycle so that the oxygen carrier solid releases about 2% by weight of oxygen (relative to the oxidized mass of oxygen carrier solid introduced) in each reduction cycle. The oxidation time (step 4 of the cycle) is sufficient to completely reoxidize the particles (15 min).

The particle size distribution was measured with a Malvern particle size analyzer, using Fraunhofer theory. The particle size analyzer is a Malvern Mastersizer 3000 particle size analyzer, and the measurement is carried out by the liquid route.

The mercury porosimetry measurements were performed on the Autopore IV device marketed by Micromeritics, taking into account a mercury surface tension of 485 dyn/cm and a contact angle of 140°. The minimum pore size that can be measured by mercury porosimetry is 3.65 nm.

The nitrogen adsorption isotherms were carried out on the ASAP 2420 device marketed by Micromeritics.

Example 2: CuO/Alumina Oxygen Carrier Solid

According to this example 2, an oxygen carrier solid is formed from alumina as a support matrix for a redox active mass of copper oxide(s).

The alumina used for this example is Puralox SCCa 150-200 marketed by Sasol. The particle size distribution of the aluminous support indicates Dv10=104 μm, Dv50=161 μm and Dv90=247 μm.

The pore volume of the particles measured by mercury porosimetry is 0.450 ml/g, and the pore size distribution is between 5 and 15 nm, centered on 9 nm. The macropore volume of the support measured by mercury porosimetry is 0.007 ml/g (1.5% of the total pore volume).

The nitrogen adsorption isotherm of the Puralox makes it possible to measure a specific surface area of 199 m²/g, a micropore volume (pores<2 nm) of zero and a mesopore volume (2 nm<pores<50 nm) of 0.496 ml/g.

233 g of Puralox alumina were impregnated according to the dry impregnation method, with 96.5 g of copper nitrate trihydrate dissolved in the necessary volume of demineralized water. After drying at 120° C. and calcining at 850° C. for 12 h, a solid containing 12% by weight of CuO is obtained; the crystallographic phases detected by XRD are γ-$Al_2O_3$ and CuO. The distribution of copper within the particles is homogeneous.

The pore volume of the particles of the solid obtained, measured by mercury porosimetry, is 0.367 ml/g, of which 0.015 ml/g (i.e. 4% of the total pore volume measured by mercury porosimetry) is due to the macroporosity. The pore size distribution is between 5 and 20 nm and centered on 11.25 nm, as can be seen in the graph of FIG. 1A representing the volume of mercury injected Vi (ml/g) into the porosity, and also the ratio dV/dD (derivative of (volume of Hg introduced/pore size), giving information on the pore size distribution), as a function of the pore diameter (nm), for the oxygen carrier solid according to this example. The particles are therefore essentially mesoporous.

The nitrogen adsorption isotherm of the oxygen carrier solid according to this example makes it possible to measure a specific surface area of 135 m²/g, a micropore volume (pores<2 nm) of zero and a mesopore volume (2 nm<pores<50 nm) of 0.404 ml/g.

The oxygen carrier solid according to this example was aged under the conditions described in example 1.

Figure 1B:
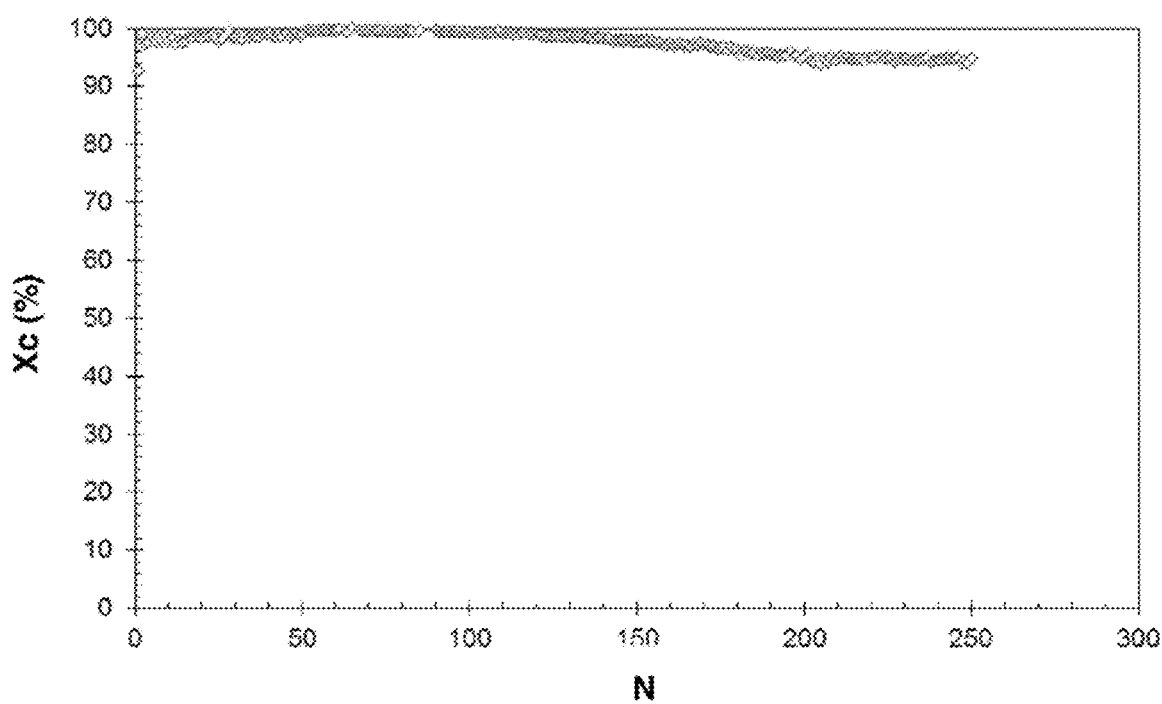

FIG. 1B is a graph representing the normalized degree of conversion Xc of methane as a function of the number N of redox cycles in a CLC process using the oxygen carrier solid according to example 2.

The conversion of methane is of the order of 98% at the start of the test, it increases until it reaches 100%, then a gradual deactivation is observed after the hundredth cycle. The conversion then stabilizes around 95%.

It should be noted that the nature of the active mass used (CuO) leads to the appearance of oxygen during the nitrogen purge step. The particles may therefore be used either in a CLC or CLOU process.

Figure 1C:
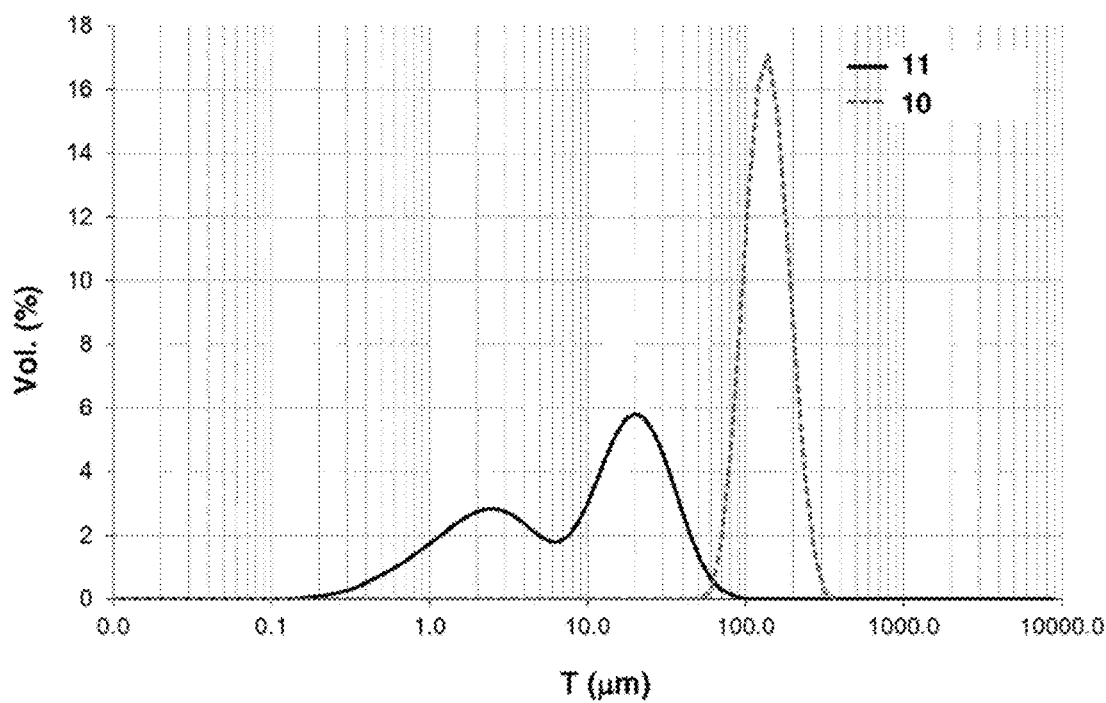

After the test, the sample underwent a very significant attrition, with almost all the particles having a size of less than 100 μm, as is clearly visible in the graph of FIG. 1C, representing the particle size distribution (μm) of the oxygen carrier solid according to this example before (curve 10) and after (curve 11) the use thereof in a CLC process, i.e. before and after the aging test according to example 1.

Figure 1D:
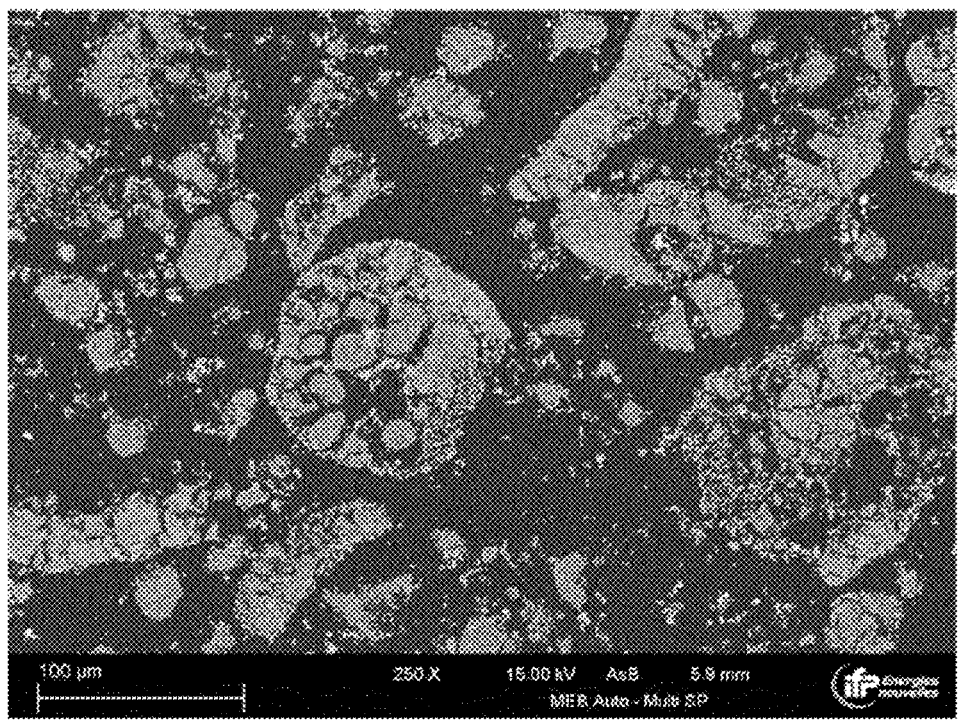

The SEM images on a polished section of the particles after the aging test according to example 1, such as the image from FIG. 1D, show that the constituent aluminous matrix of the particles did not withstand the 250 successive redox cycles. Most of the particles are actually in the form of small fragments (a few tens of μm). In addition, additional SEM-EDX analyses show that the finest particles observed (a few μm in size) consist almost exclusively of copper and oxygen.

This example shows that when the active mass is deposited on a purely mesoporous alumina, the accumulation of redox cycles leads to the cracking of said aluminous matrix, and to the migration of the copper within the aluminous matrix to form clusters composed essentially of copper. The mechanical strength of the cracked ceramic matrix is then insufficient and the lifetime of the particles is drastically reduced.

Example 3: CuO/5% $SiO_2$ Siliceous Alumina Oxygen Carrier Solid

According to this example 3, an oxygen carrier solid is formed from 5% $SiO_2$ siliceous alumina as a support matrix for a redox active mass of copper oxide(s) (CuO and $CuAl_2O_4$).

The siliceous alumina used is Siralox 5 marketed by Sasol and which contains 5% by weight of silica ($SiO_2$). The particle size distribution indicates $Dv_{10}$=60 μm, $Dv_{50}$=89 μm and $Dv_{90}$=131 μm. The pore volume measured by mercury porosimetry of the alumina-silica support is 0.549 ml/g, and the pore size distribution is between 5 and 30 nm, centered on 13 nm. The macropore volume is 0.033 ml/g, i.e. 6% of the total pore volume measured by mercury porosimetry.

The nitrogen adsorption isotherm of the Siralox 5 makes it possible to measure a specific surface area of 173 m²/g, a micropore volume (pores<2 nm) of zero and a mesopore volume (2 nm<pores<50 nm) of 0.601 ml/g.

Figure 2A:
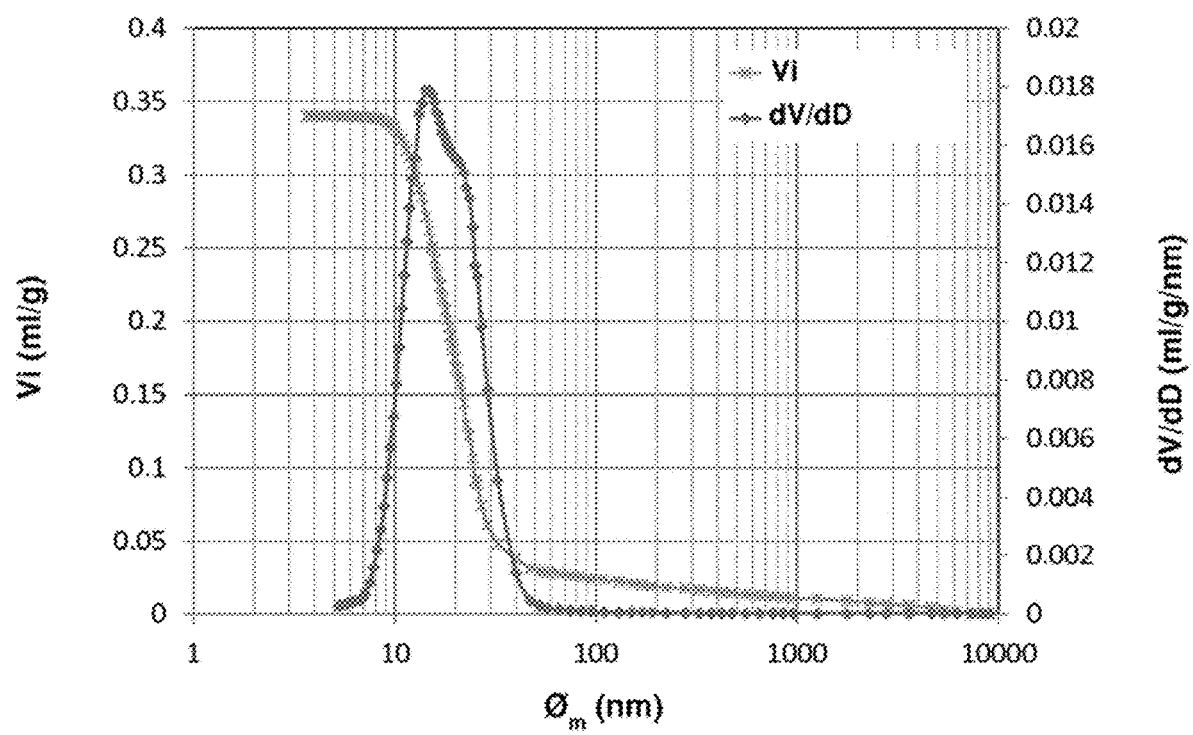
FIGS. 2A, 2B, 2C and 2D relate to an oxygen carrier solid according to example 3 (example not in accordance with the invention).

240 g of siliceous alumina were impregnated according to the dry impregnation method, with 109 g of copper nitrate trihydrate in aqueous solution. After drying at 120° C. and calcining at 1000° C. for 12 h, a solid containing 13% by weight of CuO equivalent is obtained. The crystallographic phases detected by XRD are δ-$Al_2O_3$, θ-$Al_2O_3$, $CuAl_2O_4$ and CuO. The SEM backscattered electron image (a) on a polished section and the EDX mapping (b) of FIG. 2C show that the copper is relatively well dispersed within the particles, but less homogeneously than in example 2.

The pore volume of the particles measured by mercury porosimetry is 0.340 ml/g, of which 0.029 ml/g (8.5%) is due to macroporosity. The pore size distribution is between 7 and 50 nm and centered on 15 nm, as can be seen in the graph of FIG. 2A representing the volume of mercury injected Vi (ml/g) into the porosity, and also the ratio dV/dD, as a function of the pore diameter (nm), for the oxygen carrier solid according to this example. The particles after impregnation/calcination are essentially mesoporous.

The specific surface area measured by nitrogen adsorption is 77 $m^2/g$.

The oxygen carrier solid according to example 3 was aged under the conditions described in example 1.

Figure 2B:
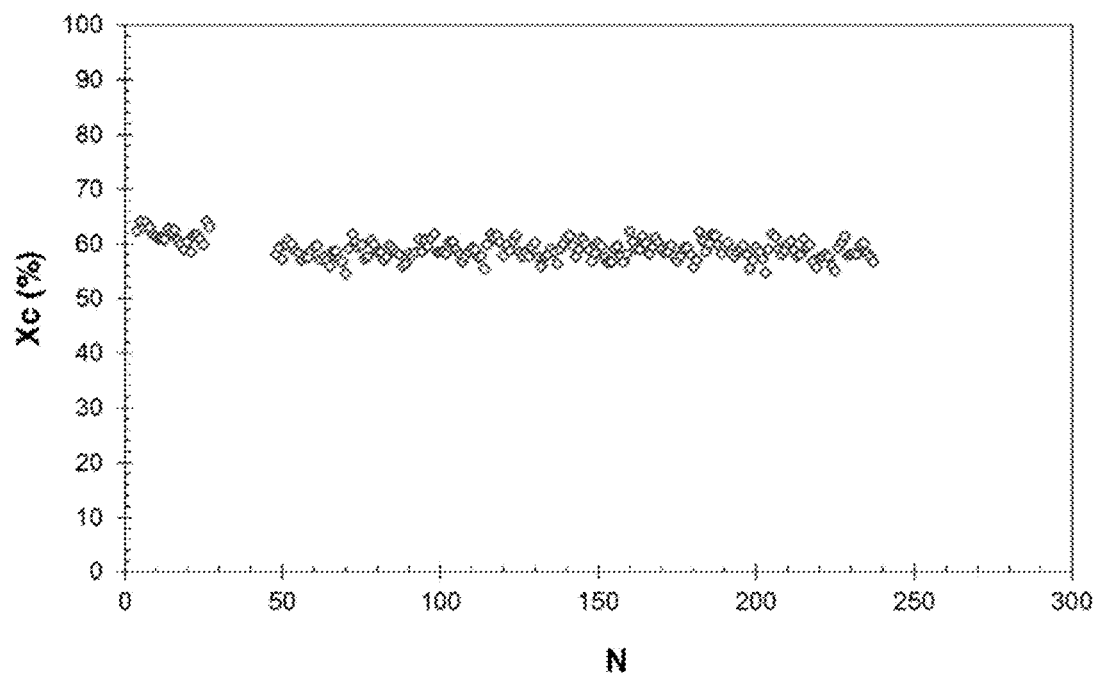
Figure 2C:
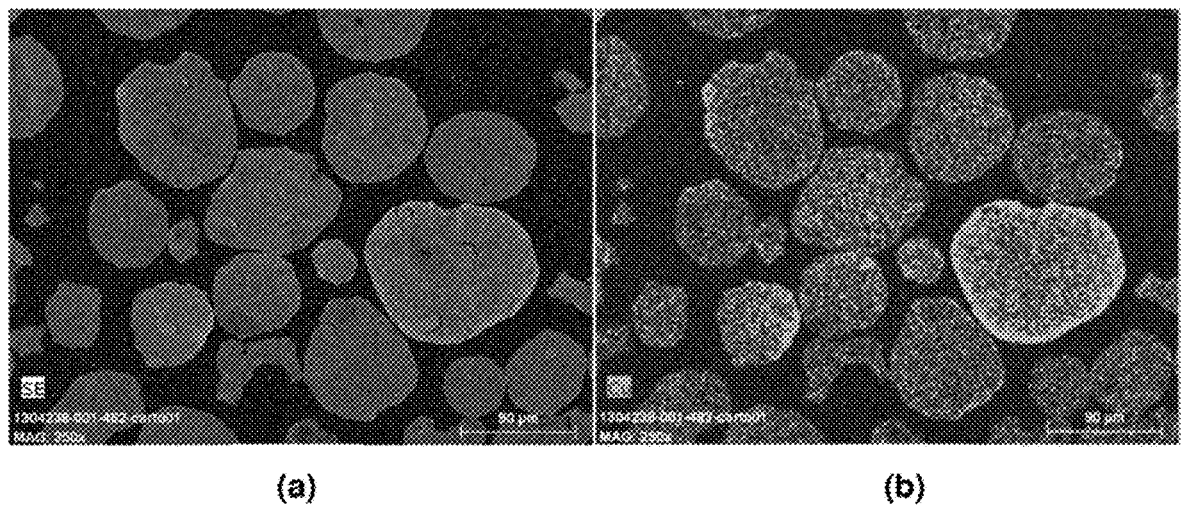

The methane conversion is stable, of the order of 60% over the entire test (FIG. 2B).

It should be noted that the nature of the active mass used (copper oxides) leads to the appearance of oxygen during the nitrogen purge step. The particles may therefore be used either in a CLC or CLOU process.

The partial conversion of methane with respect to example 2 is not a problem regarding the CLC or CLOU process on an industrial scale, it being possible for the complete conversion of the fuel to be achieved by modifying the residence times of the particles, the gas velocities and/or the inventory in the reduction reactor.

The size distribution of the particles after the aging test is similar to that of the material before testing, which indicates a better mechanical strength of the alumina-silica matrix compared to the particles on pure alumina.

Figure 2D:
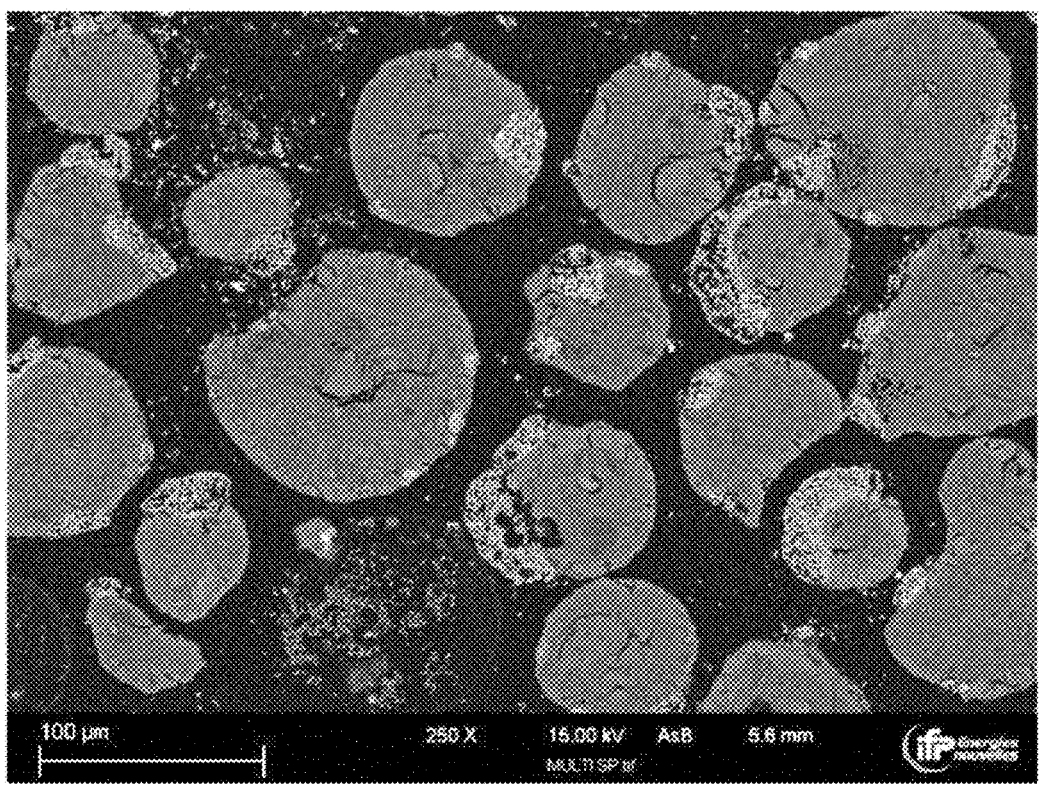

It is observed, however, that almost all of the copper initially dispersed within the particles migrated to the periphery of said particles to form porous zones containing essentially copper and a little aluminum, as can be seen in the SEM image of FIG. 2D. The mechanical strength of these zones, although porous, is sufficient so that the layers and clusters formed are still in most cases integral with the initial alumina-silica support under the conditions described in example 1. However, it is not possible to use particles of this type in a circulating fluidized bed on an industrial scale, where the higher gas velocities and the inevitable attrition by abrasion would result in the rapid elimination of all of the copper accumulated at the periphery.

According to the EDX mapping measurements carried out, the zone of the particles where the morphology is relatively unchanged with respect to the initial silica-alumina consists predominantly of alumina and contains only traces of copper, and also almost all of the silicon. The presence of silicon in the ceramic matrix thus makes it possible to stabilize said ceramic matrix. However, all the copper initially well dispersed in the mesoporous matrix migrated to the periphery of the particles during successive redox cycles.

Example 4: CuO/Celsian Oxygen Carrier Solid

According to this example 4, an oxygen carrier solid is formed comprising a celsian ceramic matrix within which a redox active mass of copper oxide(s) is dispersed.

The oxygen carrier solid according to this example is obtained from a BaX macroporous zeolite precursor (BaX stands for barium-exchanged X zeolite), using the following steps:

agglomerating NaX zeolite crystals with an Si/Al atomic ratio=1.25 and a number-average diameter equal to 1.5 μm, with kaolinite and silica, and shaping by granulation, followed by drying and then calcining at 550° C. in a stream of nitrogen for 2 h, and screening of the agglomerates obtained so as to recover particles having a particle size of between 200 and 500 μm, with a volume median diameter of around 350 μm.

zeolitizing the binder by contact of the particles obtained, placed in a glass reactor, with an aqueous solution of sodium hydroxide with a concentration of 100 g/l at a temperature of 100° C. with stirring for 3 h. The particles are then washed in 3 successive operations of washing with water followed by the emptying of the reactor. The effectiveness of the washing is ensured by measuring the final pH of the washing waters which is between 10 and 10.5.

a barium exchange using a 0.5 M barium chloride solution at 95° C. in four steps. In each step, the ratio of the volume of solution to mass of solid is 20 ml/g and the exchange is continued for 4 hours each time. Between each exchange, the solid is washed several times in order to rid it of excess salt.

The degree of barium exchange of this zeolite precursor is 95%.

Figure 3A:
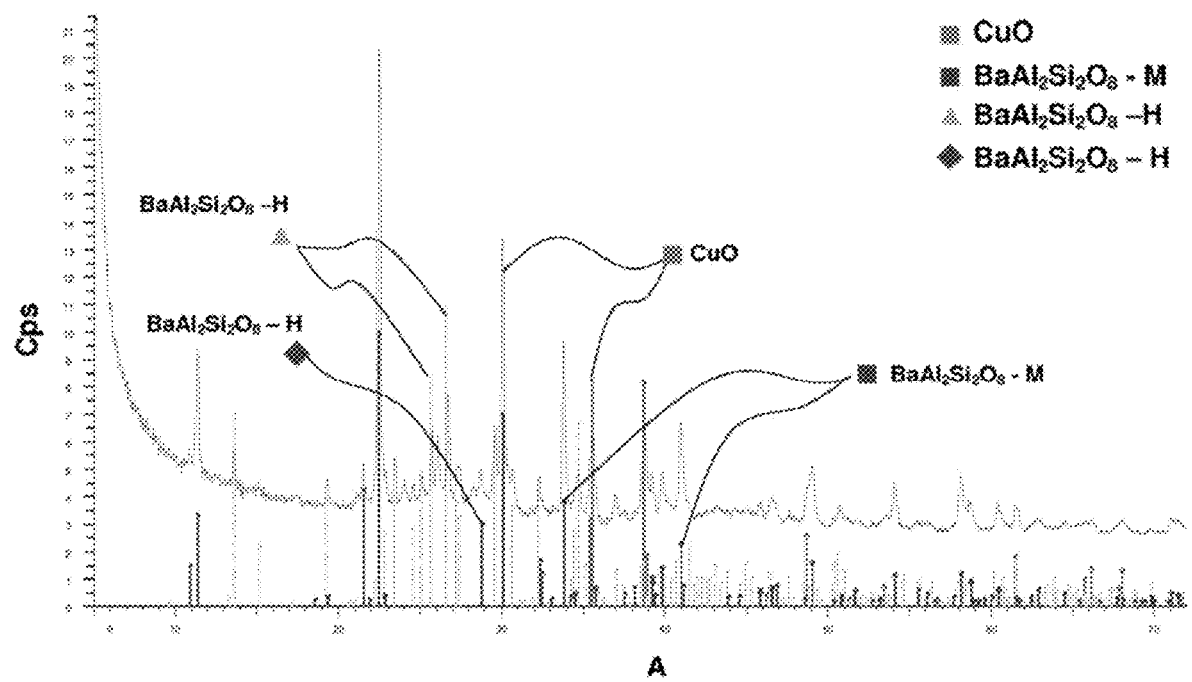
FIGS. 3A, 3B, 3C, 3D and 3E relate to an oxygen carrier solid according to example 4 (example in accordance with the invention).

The pore volume of the precursor of the shaped ceramic matrix, which is a macroporous BaX zeolite material in the form of particles, measured by mercury porosimetry, is 0.206 ml/g. The macropore volume (pore size>50 nm) is 0.191 ml/g, and the mesopore volume (3.65 nm<pores<50 nm) is 0.015 ml/g. The size distribution of the macropores is between 100 nm and 1000 nm, centered on 330 nm. This distribution is visible in FIG. 3C, where Vi Z refers to the porosity of the precursor of the ceramic matrix (shaped macroporous BaX zeolite material).

The nitrogen adsorption isotherm of this precursor of the ceramic matrix makes it possible to measure a specific surface area of 676 $m^2/g$, a micropore volume (pores<2 nm) of 0.24 ml/g and a mesopore volume (2 nm<pores<50 nm) of 0.04 ml/g.

120 g of this precursor of the ceramic matrix were dry impregnated with 57 g of copper nitrate trihydrate in aqueous solution. After drying at 120° C. and calcining at 800° C. for 12 h, an oxygen carrier solid according to the invention containing 13.5% by weight of CuO is obtained. The particle size distribution, measured by laser particle size analysis in the liquid phase, indicates Dv10=199 μm, Dv50=341 μm and Dv90=534 μm.

After calcining at 800° C., the initial zeolite structure is completely destroyed. Tenorite (CuO) and two celsian polymorphs (hexagonal and monoclinic) are detected by XRD, as is shown on the X-ray diffractogram of FIG. 3A. In this figure, A on the x-axis corresponds to the angle 2 θ (in degrees) and Cps on the y-axis represents the number of counts during the measurement. The intensity of the diffraction peaks of the hexagonal form of celsian (H) is higher than that measured for the monoclinic form (M).

The pore volume of the oxygen carrier solid according to the invention, measured by mercury porosimetry, is 0.153 ml/g. The macropore volume (pore size>50 nm) is 0.145 ml/g (94.8%), and the mesopore volume is 0.008 ml/g. The size distribution of the macropores is between 100 nm and 4000 nm, centered on 400 nm. The grain density is 2086 $kg/m^3$. This distribution is visible in FIG. 3C, where Vi S refers to the porosity of the initial oxygen carrier solid (before aging test).

The specific surface area of the oxygen carrier according to the invention, measured by nitrogen adsorption according to the BET method, is 5 $m^2/g$.

Figure 3B:
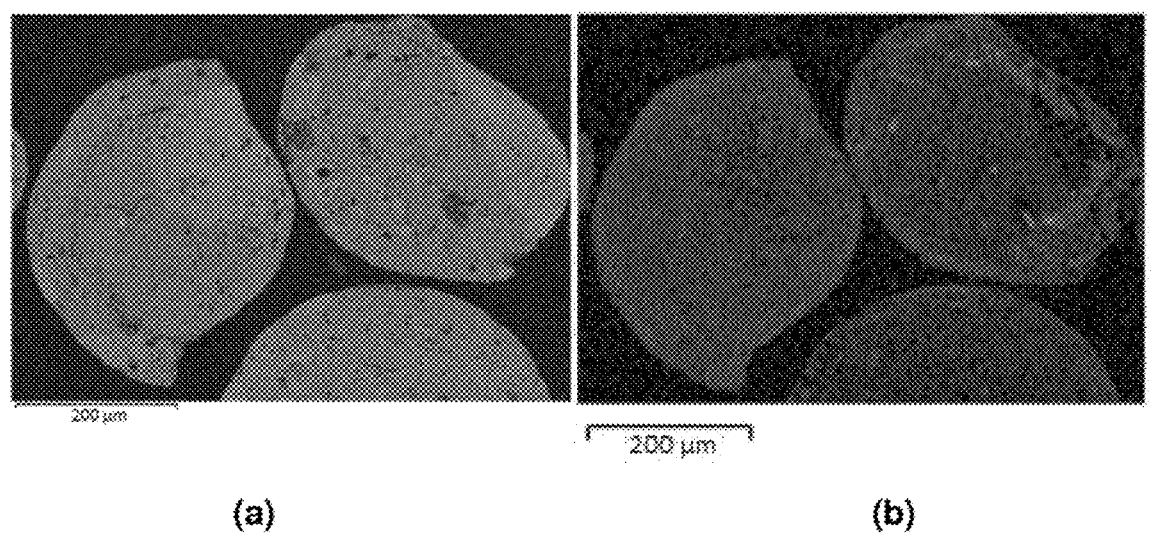
Figure 3C:
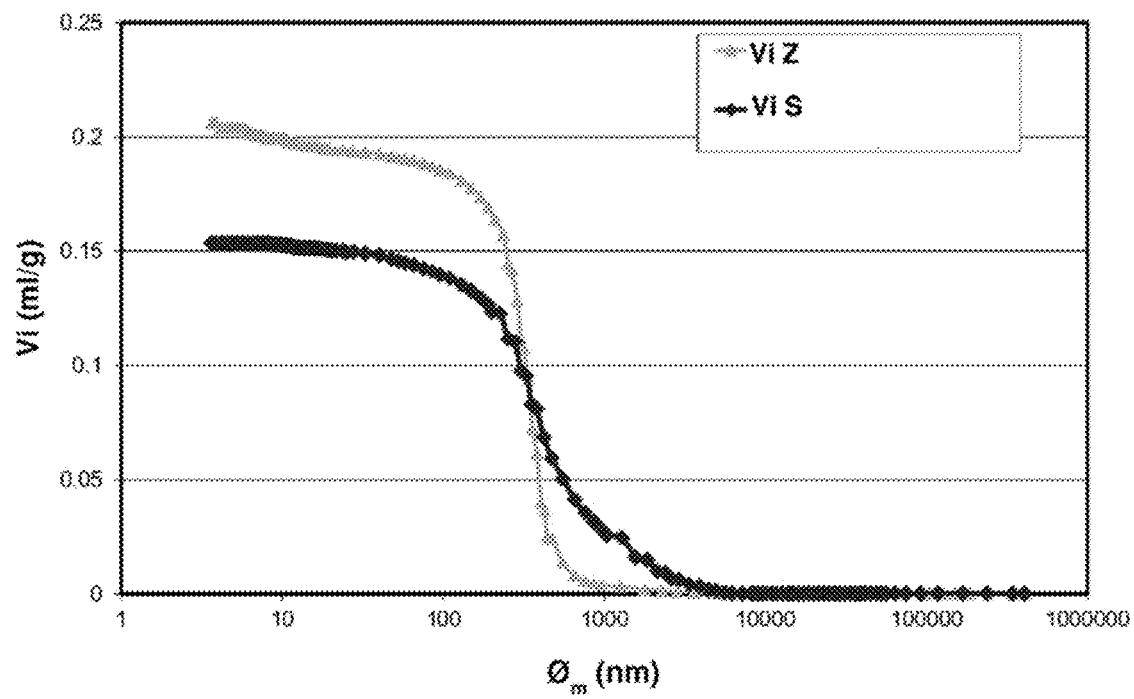

SEM analysis (FIG. 3B, SEM backscattered electron image (a) and EDX mapping in (b)) on a polished section shows that the distribution of copper within the particles is relatively homogeneous, in the form of nodules having a size of between 0.1 µm and 5 µm dispersed in the macroporosity.

The aging of the particles in a batch fluidized bed was carried out according to the same protocol as in example 1.

The conversion of methane to $H_2O$ and $CO_2$ is stable, of the order of 61% over the entire test.

It should be noted that the nature of the active mass used (CuO) leads to the appearance of oxygen during the nitrogen purge step. The particles may therefore be used either in a CLC or CLOU process.

The partial conversion of methane with respect to example 2 is not a problem regarding the CLC or CLOU process on an industrial scale, it being possible for the complete conversion of the fuel to be achieved by modifying the residence times of the particles, the gas velocities and/or the inventory in the reduction reactor.

As in example 3, the particle size distribution after the aging test is similar to that of the material before testing.

Figure 3D:
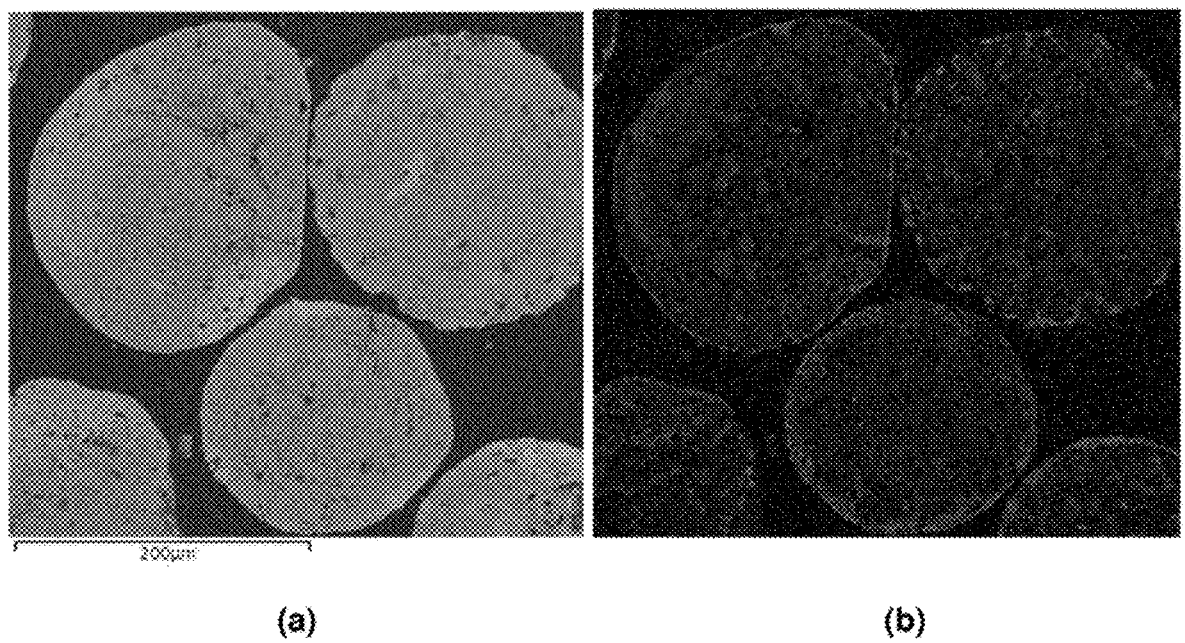
Figure 3E:
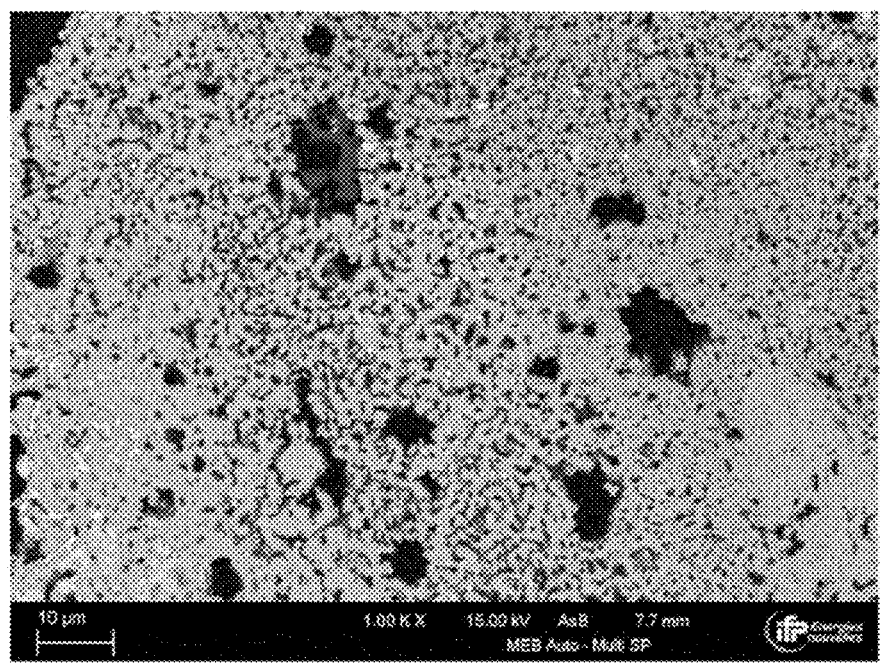

Unlike the observations of example 3, the distribution of the copper, after 250 cycles in a batch fluidized bed, within the particles of the oxygen carrier according to the invention remains generally homogeneous, with a markedly minimized tendency for copper to migrate to the periphery of the particles, as visible in the SEM image (a) and the EDX mapping (b) of FIG. 3D. The presence of cuprous nodules with a size of between 0.1 µm and 5 µm is still observed in the porosity. This texture is clearly visible in the SEM backscattered electron image of FIG. 3E relating to a detail of a particle of the oxygen carrier solid after aging.

The main crystalline phases detected by XRD after aging are tenorite (CuO) and monoclinic celsian. Some very low intensity peaks characteristic of hexagonal celsian and copper aluminate ($CuAl_2O_4$) are also present.

The pore volume of the particles measured by mercury porosimetry decreased by 20% (0.115 ml/g) during aging, and the pore size increased (pore size distribution centered on 600 nm). A slight sintering of the celsian matrix therefore took place. However, in view of these results, and compared to the other examples, the oxygen carrier solid according to this example 4 has good resistance to sintering.

The oxygen carrier solid after 250 redox cycles nevertheless retains a pore size distribution and a pore volume which are sufficient to limit the migration of the copper within the particles.

The morphological evolution of the oxygen carrier solid according to the invention (porosity and distribution of the copper) therefore makes it possible to envisage the prolonged use of these particles in an industrial circulating fluidized-bed process.

Example 5: CuO/Nepheline Oxygen Carrier Solid

According to this example 5, an oxygen carrier solid is formed comprising a nepheline (feldspathoid) ceramic matrix within which a redox active mass of copper oxide(s) is dispersed.

The oxygen carrier solid according to this example is obtained from an NaX macroporous zeolite precursor, using the following steps:
  agglomerating NaX zeolite crystals with an Si/Al atomic ratio=1.25 and a number-average diameter equal to 1.5 µm, with kaolinite and silica, and shaping by granulation, followed by drying and then calcining at 550° C. in a stream of nitrogen for 2 h, and screening of the agglomerates obtained so as to recover particles having a particle size of between 200 µm and 500 µm, with a volume median diameter of around 350 µm.

The steps of binder zeolitization and exchange with barium were not carried out.

Figure 4A:
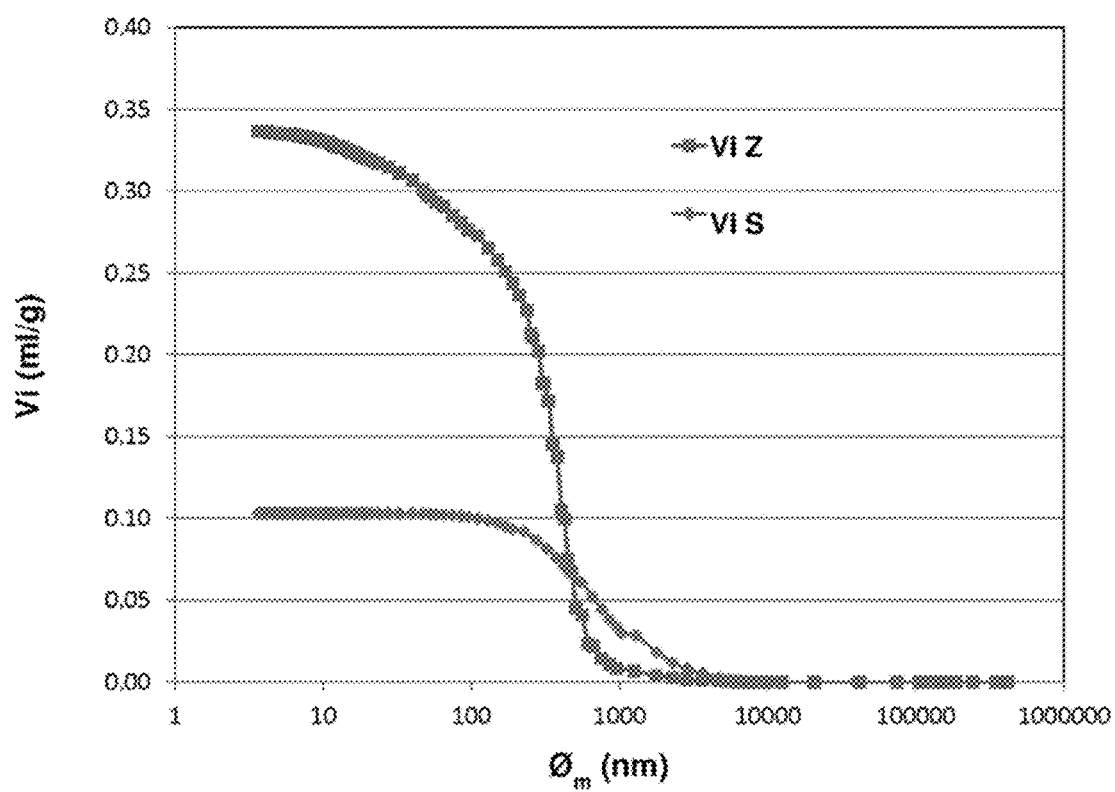
FIGS. 4A, 4B and 4C relate to an oxygen carrier solid according to example 5 (example not in accordance with the invention).

The pore volume of the precursor of the shaped ceramic matrix (macroporous NaX zeolite material), measured by mercury porosimetry, is 0.336 ml/g. The macropore volume (pore size>50 nm) is 0.296 ml/g, and the mesopore volume is 0.040 ml/g. The size distribution of the macropores is between 100 nm and 1000 nm, centered on 330 nm. This distribution is visible in FIG. 4A where Vi Z refers to the porosity of the precursor of the ceramic matrix.

The nitrogen adsorption isotherm of the precursor of the ceramic matrix makes it possible to measure a specific surface area of 749 $m^2$/g, a micropore volume (pores<2 nm) of 0.260 ml/g and a mesopore volume (2 nm<pores<50 nm) of 0.112 ml/g.

105 g of the precursor of the ceramic matrix were dry impregnated with 43.9 g of copper nitrate trihydrate in aqueous solution. After drying at 120° C. and calcining at 800° C. for 12 h, a solid containing 12% by weight of CuO equivalent on silica-alumina is obtained. The particle size distribution, measured by laser particle size analysis in the liquid phase, indicates Dv10=156 µm, Dv50=286 µm and Dv90=458 µm.

Figure 4B:
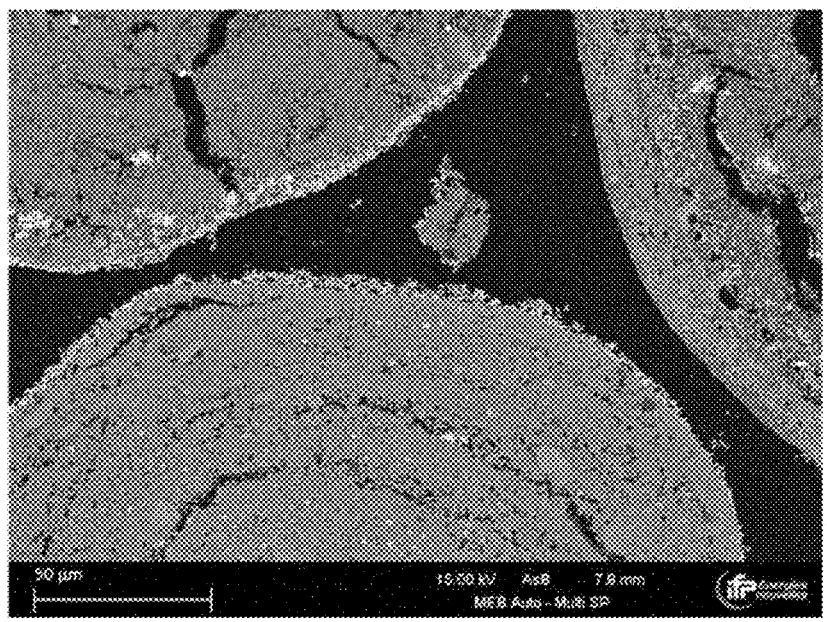

After calcining at 800° C., tenorite (CuO) and nepheline of formula $Na_{3.6}Al_{3.6}Si_{4.4}O_{16}$ are the only two phases detected by XRD. SEM images on a polished section, such as the image of FIG. 4B, show a significant cracking of the nepheline matrix in comparison with the particles of example 4, and an accumulation of copper at the periphery of the particles. The formation of micrometric copper nodules in the macroporosity of the matrix is also observed.

The pore volume of the particles of example 5, measured by mercury porosimetry, is 0.103 ml/g, with a broad pore size distribution (130 nm to 4.7 µm) centered on 750 nm. The pore volume consists of 100% macropores. This distribution is visible in FIG. 4A, where Vi refers to the porosity of the initial oxygen carrier solid (before aging test).

The aging of the particles in a batch fluidized bed was carried out according to the same protocol as in example 1.

The conversion of methane to water and carbon dioxide is stable, but only of the order of 30% over the entire test.

The partial conversion of methane with respect to example 2 is not a problem regarding the CLC or CLOU process on an industrial scale, it being possible for the complete conversion of the fuel to be achieved by modifying the residence times of the particles, the gas velocities and/or the inventory in the reduction reactor, but the solid according to example 5 is less efficient than that of example 4 and would require a higher inventory.

Despite the fluidization, the solid caked slightly during the test (a friable agglomerate is observed during the unloading of the reactor). After (easy) grinding of the agglomerate in the reactor, the measurement of the particle size distribution shows that a high proportion of fine particles (9% by weight of particles of size<100 µm) was created, probably due to severe cracking observed starting from the calcination step at 800° C. The absence of zeolitization of the binder after shaping is probably the cause of the lower mechanical strength of the particles.

Tenorite and nepheline are still predominantly present, and the main X-ray diffraction lines characteristic of quartz, cristobalite and $CuAlO_4$ copper aluminate are also observed. The very low relative intensity of these lines indicates that these three phases are in the minority.

Figure 4C:
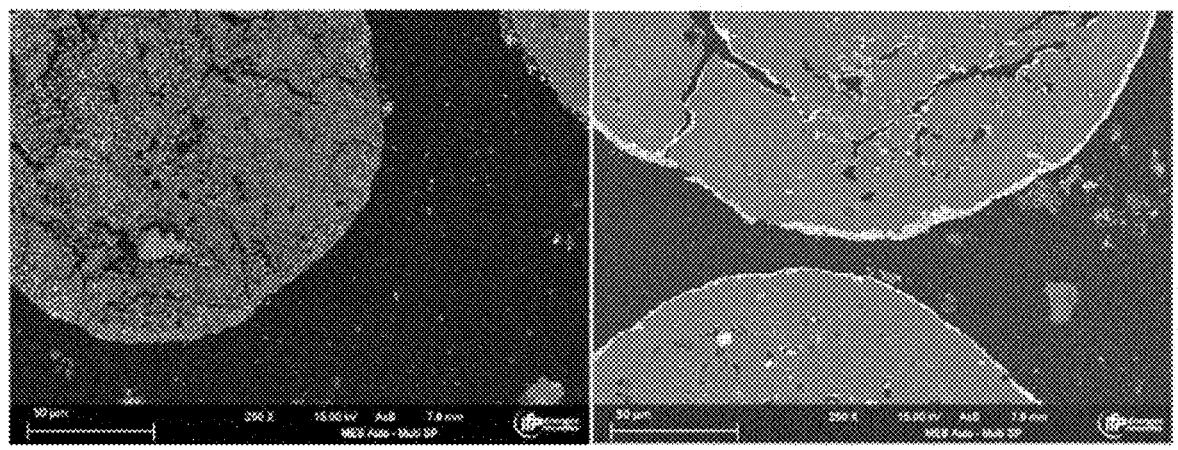

SEM images on a polished section of the particles after aging show two distinct morphologies of the particles (FIG. 4C, SEM backscattered electron images (a) and (b)):
- a significant densification of the nepheline matrix is observed on certain particles, which has led to a significant migration of copper to the periphery of the particles (SEM image (b) of FIG. 4C). The crust observed around these particles is probably responsible for the caking observed after 250 cycles. Some of the copper present in these particles coalesced inside the very large pores formed during the test at the gas/solid interface.
- The second morphology consists of particles which are still macroporous within which the copper forms micrometric nodules (SEM image (a) of FIG. 4C).

The relatively low melting point of nepheline (1230° C.) relative to celsian (1760° C.) may be responsible for the higher densification observed. It is probable that some of the copper trapped in the particles whose matrix is dense is not accessible to the gas, hence the lower conversion of methane than in example 4. In addition to the reduced reactivity compared with example 4, the formation of a metal oxide crust at the periphery of a high proportion of the particles makes the use of particles of this type inconceivable in a circulating fluidized bed on an industrial scale (risk of agglomeration and of losses of copper by attrition that are too high).

The pore volume of the particles measured by mercury porosimetry (0.088 ml/g) is of the same order of magnitude as before, as is the pore size distribution (110 nm-4.7 μm).

Example 6: CuO/Albite Oxygen Carrier Solid

According to this example 6, an oxygen carrier solid is formed comprising an albite (feldspathoid) ceramic matrix within which a redox active mass of copper oxide(s) is dispersed.

The oxygen carrier solid according to this example is obtained from an NaY macroporous zeolite precursor, using the following steps:
- agglomerating NaY zeolite crystals, of FAU structure identical to X and LSX zeolites, but with an Si/Al atomic ratio=3, i.e. higher than X zeolite or LSX zeolite, and having a number-average diameter equal to 0.7 μm, with kaolinite and silica, and shaping by granulation, followed by drying and then calcining at 550° C. in a stream of nitrogen for 2 h, and screening of the agglomerates obtained so as to recover particles having a particle size of between 200 μm and 500 μm, with a volume median diameter of around 350 μm.
- zeolitizing the binder by contact of the particles obtained, placed in a glass reactor, with an aqueous solution of sodium hydroxide with a concentration of 100 g/l at a temperature of 100° C. with stirring for 3 h. The particles are then washed in three successive operations of washing with water followed by the emptying of the reactor. The effectiveness of the washing is ensured by measuring the final pH of the washing waters which is between 10 and 10.5.

Figure 5A:
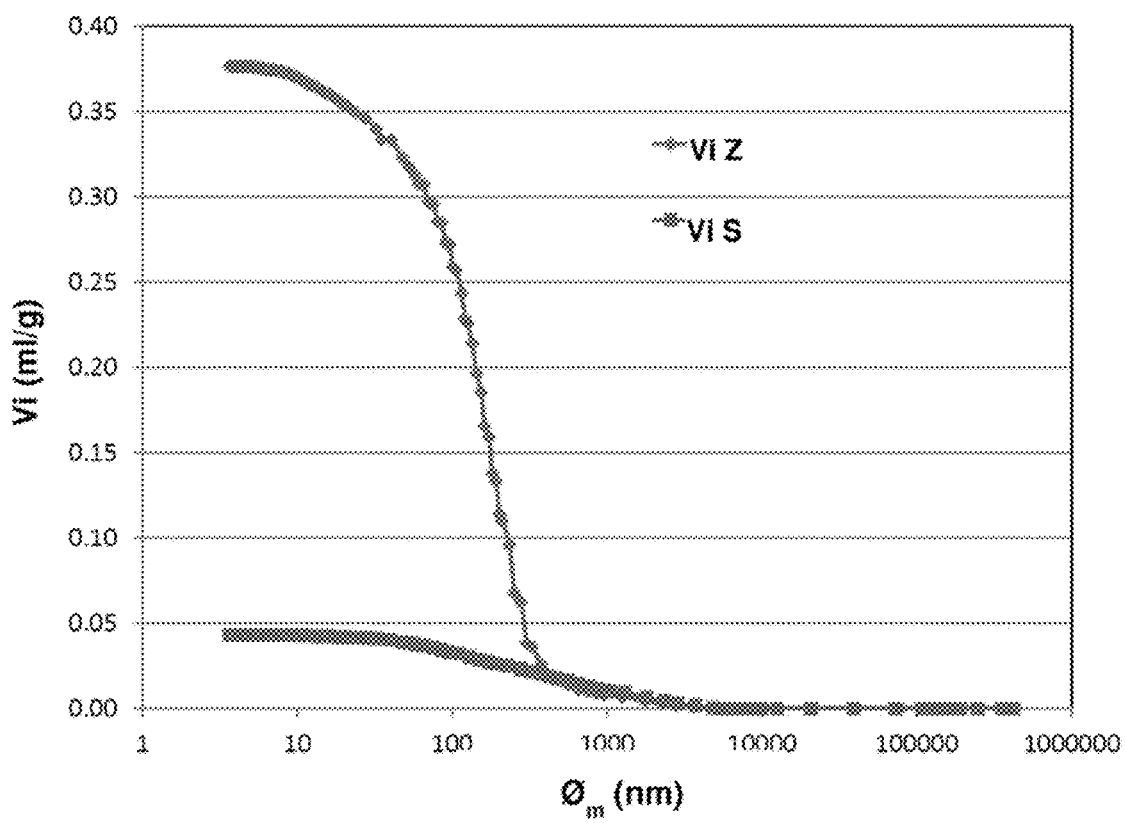
FIGS. 5A, 5B and 5C relate to an oxygen carrier solid according to example 6 (example not in accordance with the invention).

The pore volume of the precursor of the shaped ceramic matrix (macroporous NaY zeolite material), measured by mercury porosimetry, is 0.376 ml/g. The macropore volume (pore size>50 nm) is 0.319 ml/g, and the mesopore volume (3.65 nm<pores<50 nm) is 0.057 ml/g. The size distribution of the macropores is between 100 nm and 1000 nm, centered on 330 nm. This distribution is visible in FIG. 5A where Vi Z refers to the porosity of the precursor of the ceramic matrix.

The nitrogen adsorption isotherm of the precursor of the ceramic matrix makes it possible to measure a specific surface area of 676 m$^2$/g, a micropore volume (pores<2 nm) of 0.24 ml/g and a mesopore volume (2 nm<pores<50 nm) of 0.04 ml/g.

108 g of this precursor of the ceramic matrix were dry impregnated with 44 g of copper nitrate trihydrate in aqueous solution. After drying at 120° C. and calcining at 800° C. for 12 h, a solid containing 11.8% by weight of CuO equivalent is obtained.

After calcining at 800° C., tenorite (CuO), an amorphous phase and quartz are detected by XRD. Some diffraction lines of very low intensity, indicating an onset of crystallization of a new phase, cannot be definitively attributed.

The particle size distribution indicates Dv10=104 μm, Dv50=212 μm and Dv90=356 μm.

Figure 5B:
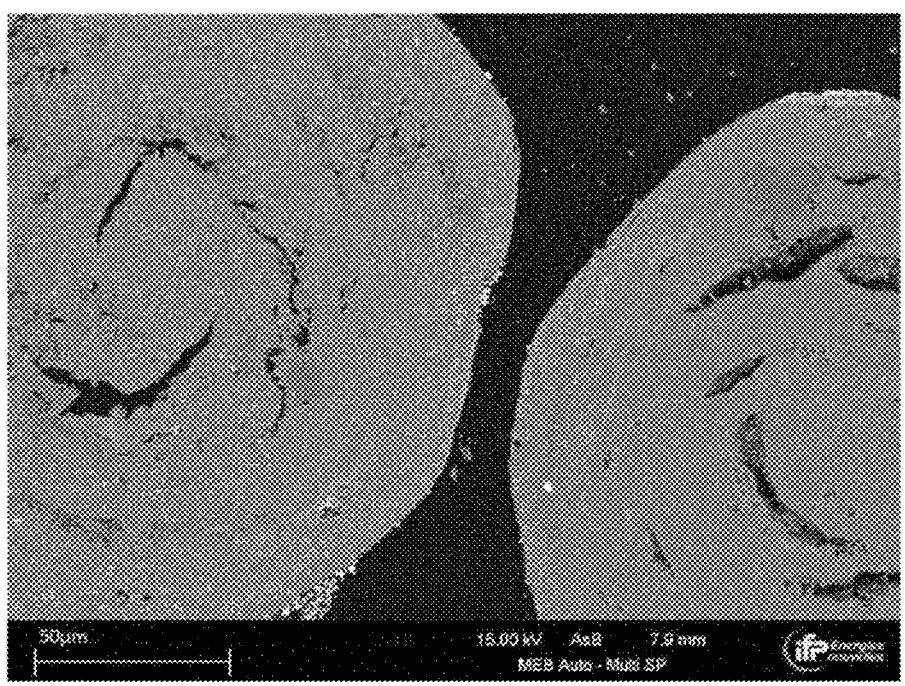

The porosity of the particles of the oxygen carrier solid is only 9% and the pore size distribution is very broad (from 30 nm to 5000 nm, see FIG. 5A curve Vi S), reflecting the presence of very large cavities created during calcination and observed by SEM, and also a densification of the amorphous silica-alumina matrix (SEM image of FIG. 5B). The total pore volume is 0.043 ml/g. The macropore volume (pore size>50 nm) is 0.038 ml/g (88.4%), and the mesopore volume is 0.005 ml/g. SEM-EDX mapping on a polished section shows that most of the copper coalesced in the form of micrometric nodules inserted into the matrix. Severe cracking occurred inside the particles.

The aging of the particles in a batch fluidized bed was carried out according to the same protocol as in example 1.

Activation of the particles is observed, the methane conversion increasing gradually from 6% in the second cycle to 14% in the 250th cycle. The solid caked slightly during the test. After (easy) grinding of the agglomerate in the reactor, the particle size distribution after the aging test is similar to that of the material before testing.

The porosity of the particles is only 4%, consisting essentially of large cavities still present within the particles (size centered around 3700 nm).

Figure 5C:
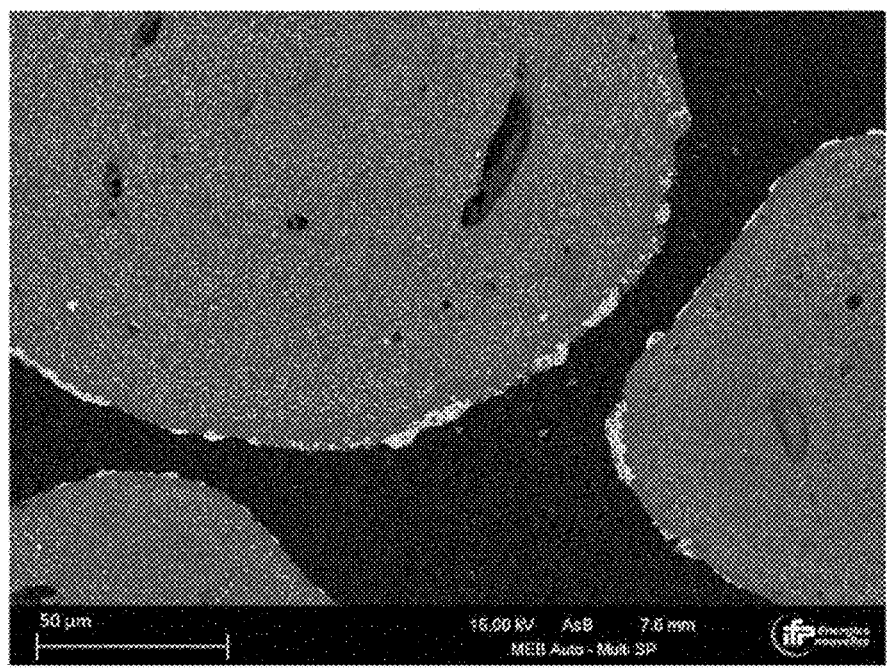

The low methane conversion can be directly related to the lack of porosity of the matrix, which encapsulates a large proportion of the copper and makes it inaccessible to the various gases. The gradual increase in conversion can probably be attributed to the migration of the copper to the periphery of the particles in the course of the redox cycles. In fact, the SEM analysis after aging shows that a copper crust has accumulated on the surface of the particles during the test (SEM image of FIG. 5C). This accumulation of copper on the surface is responsible for the agglomeration of the particles. A significant proportion of the copper is still trapped inside the matrix at the end of the test.

The XRD analysis shows that the initially amorphous matrix formed a crystalline phase, albite (NaAlSi$_3$O$_8$), whose melting point (1120° C.) is low relative to celsian. The presence of tenorite (CuO), quartz, cuprite (Cu$_2$O) and traces of nepheline is also observed.

The formation of a copper crust at the periphery of the particles and the excessively low porosity of the albite matrix makes the use of particles of this type inconceivable in a circulating fluidized bed on an industrial scale.

Example 7: CuO/Slawsonite Oxygen Carrier Solid

According to this example 7, an oxygen carrier solid is formed comprising a slawsonite (feldspar) ceramic matrix within which a redox active mass of copper oxide(s) is dispersed.

The oxygen carrier solid according to this example is obtained from an SrLSX macroporous zeolite precursor (SrLSX stands for strontium-exchanged LSX zeolite), using the following steps:

agglomerating LSX zeolite crystals with an Si/Al atomic ratio=1 and a number-average diameter equal to 1.5 µm, with kaolinite and silica, and shaping by granulation, followed by drying and then calcining at 550° C. in a stream of nitrogen for 2 h, and screening of the agglomerates obtained so as to recover particles having a particle size of between 200 µm and 500 µm, with a volume median diameter of around 350 µm.

zeolitizing the binder by contact of the particles obtained, placed in a glass reactor, with an aqueous solution of sodium hydroxide with a concentration of 100 g/l at a temperature of 100° C. with stirring for 3 h. The particles are then washed in 3 successive operations of washing with water followed by the emptying of the reactor. The effectiveness of the washing is ensured by measuring the final pH of the washing waters which is between 10 and 10.5.

a strontium exchange using a 0.5 M strontium chloride solution at 95° C. in 4 steps. In each step, the ratio of the volume of solution to mass of solid is 20 ml/g and the exchange is continued for 4 hours each time. Between each exchange, the solid is washed several times in order to rid it of excess salt.

The degree of strontium exchange of this zeolite precursor is 94%.

Figure 6A:
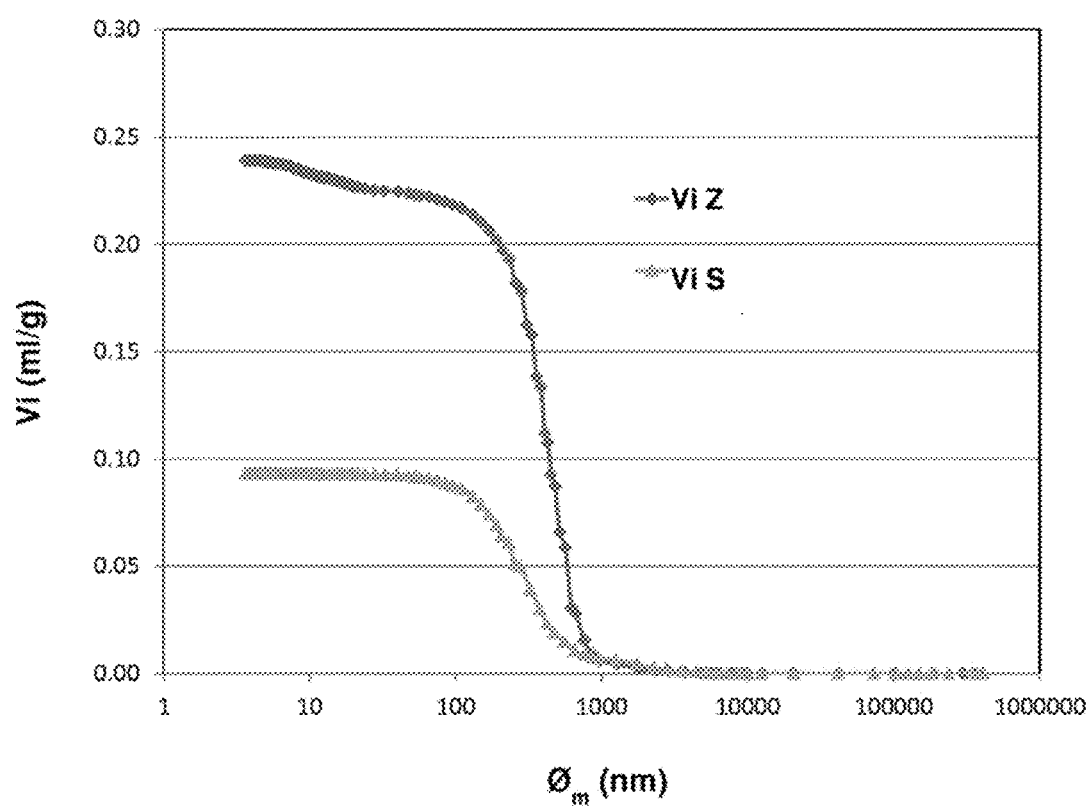
FIGS. 6A, 6B relate to an oxygen carrier solid according to example 7 (example in accordance with the invention).

The pore volume of the precursor of the shaped ceramic matrix (macroporous SrLSX zeolite material), measured by mercury porosimetry, is 0.195 ml/g. The macropore volume (pore size>50 nm) is 0.183 ml/g, and the mesopore volume is 0.012 ml/g. The size distribution of the macropores is between 50 nm and 950 nm, centered on 300 nm. This distribution is visible in FIG. 6A where Vi Z refers to the porosity of the precursor of the ceramic matrix.

122 g of this zeolite were dry impregnated with 51 g of copper nitrate in aqueous solution. After drying at 120° C. and calcining at 800° C. for 12 h, an oxygen carrier solid according to the invention containing 12% by weight of CuO is obtained. The particle size distribution, measured by laser particle size analysis in the liquid phase, indicates Dv10=195 µm, Dv50=320 µm and Dv90=495 µm.

After calcining at 800° C., the initial zeolite structure is completely destroyed. Tenorite (CuO) and two polymorphs of slawsonite (hexagonal $SrAl_2Si_2O_8$ and monoclinic $Sr_{0.8}Al_{1.7}Si_{2.3}O_8$) are detected by XRD. The intensity of the diffraction peaks of the two polymorphs is similar.

The pore volume of the oxygen carrier solid according to the invention, measured by mercury porosimetry, is 0.093 ml/g. The macropore volume (pore size>50 nm) is 0.091 ml/g, and the mesopore volume is 0.002 ml/g. The size distribution of the macropores is between 50 nm and 3500 nm, centered on 350 nm. This distribution is visible in FIG. 6A, where Vi S refers to the porosity of the initial oxygen carrier solid (before aging test).

The specific surface area of the oxygen carrier according to the invention, measured by nitrogen adsorption according to the BET method, is 3 m²/g.

SEM-EDX analysis on a polished section shows that the distribution of copper inside the particles is relatively homogeneous in the form of nodules having a size of between 0.1 µm and 5 µm dispersed in the macroporosity.

The aging of the particles in a batch fluidized bed was carried out according to the same protocol as in example 1.

The conversion of methane to water and carbon dioxide is stable, of the order of 59% over the entire test.

It should be noted that the nature of the active mass used (CuO) leads to the appearance of oxygen during the nitrogen purge step. The particles may therefore be used either in a CLC or CLOU process.

The partial conversion of methane with respect to example 2 is not a problem regarding the CLC or CLOU process on an industrial scale, it being possible for the complete conversion of the fuel to be achieved by modifying the residence times of the particles, the gas velocities and/or the inventory in the reduction reactor.

As in example 3, the particle size distribution after the aging test is similar to that of the material before testing.

Figure 6B:
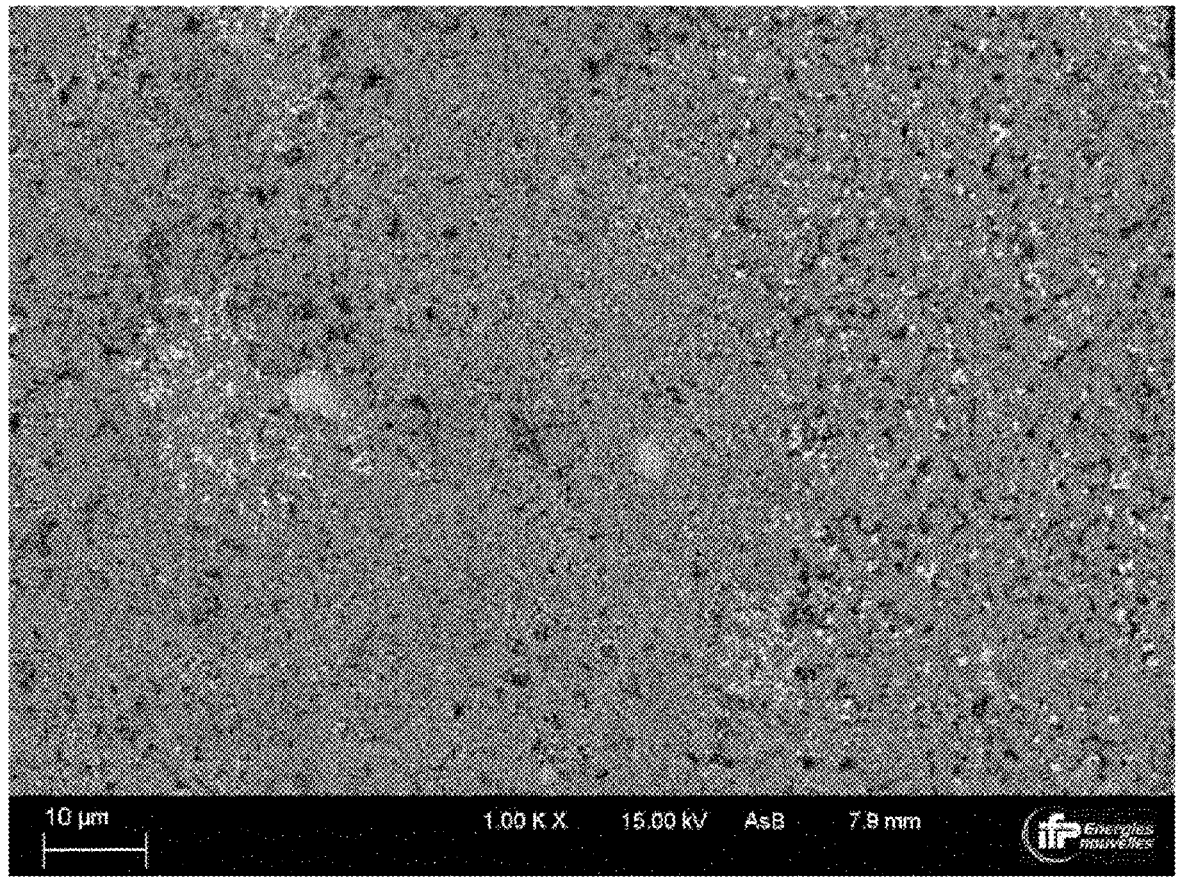

Unlike the observations of example 3, the distribution of the copper, after 250 cycles in a batch fluidized bed, within the particles of the oxygen carrier according to the invention remains generally homogeneous, with a markedly minimized tendency for copper to migrate to the periphery of the particles. The presence of cuprous nodules with a size of between 0.1 µm and 5 µm is still observed in the porosity. FIG. 6B, which is an SEM image of a portion of a particle of the oxygen carrier solid after aging, shows this texture.

The main crystalline phases detected by XRD after aging are tenorite (CuO) and monoclinic slawsonite. Some very low intensity peaks characteristic of hexagonal slawsonite and copper aluminate ($CuAl_2O_4$) are also present.

The pore volume of the particles measured by mercury porosimetry decreased by 23% (0.072 ml/g) during aging, and the pore size increased (pore size distribution centered on 550 nm). A slight sintering of the slawsonite matrix therefore took place. The oxygen carrier solid after 250 redox cycles nevertheless retains a pore size distribution and a pore volume which are sufficient to limit the migration of the copper within the particles.

The invention claimed is:

1. An oxygen carrier solid in the form of particles for a process for chemical looping redox combustion of a hydrocarbon feedstock, the oxygen carrier solid comprising:

between 5% and 75% by weight of a redox active mass, the redox active mass comprising a metal oxide or a mixture of metal oxides and being capable of transporting oxygen in the process for chemical looping redox combustion;

between 25% and 95% by weight of a ceramic matrix within which the redox active mass is dispersed, the ceramic matrix comprising between 60% and 100% by weight of at least one feldspar or feldspathoid having a melting point above 1500° C. and between 0% and 40% of at least one oxide; and a porosity such that:

the total pore volume of the oxygen carrier solid, measured by mercury porosimetry, is between 0.05 and 0.9 ml/g;

the pore volume of macropores constitutes at least 10% of the total pore volume of the oxygen carrier solid; and the size distribution of the macropores within the oxygen carrier solid, measured by mercury porosimetry, is between 50 nm and 7 µm.

2. The oxygen carrier solid as claimed in claim 1, wherein the total pore volume of the oxygen carrier solid is between 0.1 and 0.5 ml/g.

3. The oxygen carrier solid as claimed in claim 1, wherein the pore volume of the macropores constitutes at least 50% of the total pore volume of the oxygen carrier solid.

4. The oxygen carrier solid as claimed in claim 1, wherein the size distribution of the macropores within the oxygen carrier solid is between 50 nm and 4 µm.

5. The oxygen carrier solid as claimed in claim 1, wherein the redox active mass comprises at least one metal oxide included in the group consisting of the oxides of Fe, Cu, Ni, Mn and Co, a perovskite having redox properties, and a metal aluminate spinel having redox properties.

6. The oxygen carrier solid as claimed in claim 1, wherein the redox active mass comprises at least one copper oxide.

7. The oxygen carrier solid as claimed in claim 1, wherein the at least one feldspar or feldspathoid has a melting point above 1700° C.

8. The oxygen carrier solid as claimed in claim 7, wherein the at least one feldspar or feldspathoid is selected from the group consisting of celsian, slawsonite, anorthite, and kalsilite.

9. The oxygen carrier solid as claimed in claim 1, wherein the ceramic matrix comprises the at least one oxide, and the at least one oxide is selected from the group consisting of alumina, metal aluminates, silica, silicates, aluminosilicates, titanium dioxide, perovskites and zirconia.

10. The oxygen carrier solid as claimed in claim 1, wherein the particles have a particle size such that more than 90% of the particles have a size between 50 µm and 600 µm.

11. A process for preparing the oxygen carrier solid as claimed in claim 1, the process comprising the following steps:
(A) preparing a precursor of the ceramic matrix comprising:
  a1) preparing a macroporous zeolite material comprising zeolite crystals with a number-average diameter of less than or equal to 3 µm; and
  a2) conducting a cation exchange of the macroporous zeolite material with a solution of precursor ions, the precursor ions being selected to form the ceramic matrix comprising the at least one feldspar or feldspathoid with a melting point above 1500° C. at the end of step (D), the cation exchange being followed by a washing of the macroporous zeolite material, to obtain the precursor of the ceramic matrix;
(B) impregnating the precursor of the ceramic matrix obtained in step (A) with a precursor compound of the redox active mass;
(C) forming particles of the precursor of the ceramic matrix during step (a1) or at the end of step (B);
(D) drying the precursor of the impregnated ceramic matrix in particle form obtained at the end of all of the steps (A), (B) and (C); and
(E) calcining the precursor of the impregnated and dried ceramic matrix obtained in step (D) to obtain the oxygen carrier solid in the form of particles.

12. The process as claimed in claim 11, wherein step a1) comprises:
  a'1) agglomerating the zeolite crystals with a clay binder to form a zeolite agglomerate;
  a'2) shaping of the zeolite agglomerate obtained in step a'1) to produce particles, followed by a drying of the particles, and optionally followed by a screening and/or cycloning step;
  a'3) calcining the particles of the zeolite agglomerate obtained in step a'2) at a temperature between 500° C. and 600° C. to produce the macroporous zeolite material in the form of particles;
  a'4) optionally zeolitizing the clay binder by bringing the product resulting from step a'3) into contact with an alkali metal basic aqueous solution, followed by washing.

13. The process as claimed in claim 11, wherein the zeolite crystals comprise at least one zeolite with an Si/Al molar ratio of between 1.00 and 1.50.

14. The process as claimed in claim 11, wherein the cation exchange in step a2) is carried out with a solution comprising alkali metal ions or alkaline-earth metal ions.

15. The process as claimed in claim 14, wherein the cation exchange in step a2) is carried out with a solution comprising ions selected from $Ba^{2+}$, $Sr^{2+}$ and $Ca^{2+}$ ions.

16. The process as claimed in claim 11, wherein step (A) additionally comprises a step a3) of heat heat treating the macroporous zeolite material obtained in step a2), the heat treating comprising a step of drying at a temperature of between 100° C. and 400° C.

17. The process as claimed in claim 11, wherein, in step (C), the precursor of the ceramic matrix is placed in the form of particles having a particle size such that more than 90% of the particles have a size of between 50 µm and 600 µm.

18. The process as claimed in claim 11, wherein the impregnation in step (B) is carried out with an aqueous or organic solution containing at least one soluble precursor compound including copper, nickel, cobalt, iron or manganese.

19. The process as claimed in claim 11, wherein the impregnation in step (B) is carried out in one or more successive steps.

20. The process as claimed in claim 11, wherein the drying in step (D) is carried out in air or in a controlled atmosphere, at a temperature between 30° C. and 200° C.

21. The process as claimed in claim 11, wherein the calcining in step (E) is carried out in air between 450° C. and 1400° C.

22. The process as claimed in claim 11, wherein, in step a1), the zeolite crystals are mixed with at least one selected from the group consisting of alumina, metal aluminates, silica, silicates, aluminosilicates, titanium dioxide, perovskites, zirconia, and a pore-forming agent intended for increasing the macroporosity of the macroporous zeolite material.

23. A process for chemical looping redox combustion of a hydrocarbon feedstock, the process comprising circulating the oxygen carrier solid prepared according to the process as claimed in claim 11 between at least one reduction zone and one oxidation zone both operating in a fluidized bed, the temperature in the reduction zone and in the oxidation zone being between 400° C. and 1400° C.

24. A process for chemical looping redox combustion of a hydrocarbon feedstock, the process comprising circulating the oxygen carrier solid as claimed in claim 1 between at least one reduction zone and one oxidation zone both operating in a fluidized bed, the temperature in the reduction zone and in the oxidation zone being between 400° C. and 1400° C.

* * * * *